US012754133B2

United States Patent
(12) United States Patent
Kanoda et al.

(10) Patent No.: US 12,754,133 B2
(45) Date of Patent: Oct. 6, 2026

(54) REFRACTIVE-INDEX CONCENTRATION SENSOR

(71) Applicant: Keyence Corporation, Osaka (JP)

(72) Inventors: Sohei Kanoda, Osaka (JP); Shinichiro Otsu, Osaka (JP); Hirokazu Niimura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 209 days.

(21) Appl. No.: 17/860,269

(22) Filed: Jul. 8, 2022

(65) Prior Publication Data

US 2023/0063177 A1 Mar. 2, 2023

(30) Foreign Application Priority Data

Aug. 31, 2021 (JP) ................................ 2021-141876

(51) Int. Cl.
*G01N 21/41* (2006.01)

(52) U.S. Cl.
CPC ....... *G01N 21/41* (2013.01); *G01N 2201/022* (2013.01); *G01N 2201/0638* (2013.01)

(58) Field of Classification Search
CPC .. G01N 21/43; G01N 21/41; G01N 2201/022; G01N 2201/0638; G01N 21/4133; G01N 2201/0634
See application file for complete search history.

(56) References Cited

U.S. PATENT DOCUMENTS 6,161,940 A 12/2000 Choate et al.
10,203,279 B1 * 2/2019 Jääskeläinen ...... G01M 11/0228
2004/0145731 A1 * 7/2004 Nakajima .............. G01N 21/43 356/135
2006/0087654 A1 * 4/2006 Wolf .................... G01N 21/552 356/436
2009/0046277 A1 2/2009 Amamiya et al.
2009/0279074 A1 * 11/2009 Seaver ............... G01N 21/4133 356/73
2011/0096384 A1 * 4/2011 Clay ......................... G01J 1/56 359/223.1
2012/0081698 A1 * 4/2012 Christian ............... G01N 21/43 356/128

(Continued)

FOREIGN PATENT DOCUMENTS

CA 2054887 A1 * 11/1991
DE 102017220514 A1 * 5/2019 .............. C02F 1/283

(Continued)

OTHER PUBLICATIONS

U.S. Appl. No. 17/860,251, filed Jul. 8, 2022 (75 pages).
Office Action issued in corresponding Japanese Patent Application No. 2021-141876 mailed Jan. 28, 2025 (9 pages).

*Primary Examiner* — Uzma Alam

(74) *Attorney, Agent, or Firm* — Kilyk & Bowersox, P.L.L.C.

(57) ABSTRACT

Provided are a diffusion plate that diffuses light emitted from a light source, and a prism having a first surface to receive the light transmitted through the diffusion plate, a second surface to reflect the light in contact with a measurement target liquid, and a third surface to extract the reflected light. The light source, the diffusion plate, a light receiving lens, and an imaging element are accommodated in a holder that presses the prism from the inner side to the outer side.

18 Claims, 21 Drawing Sheets

(56) References Cited

U.S. PATENT DOCUMENTS

| | | | | |
|---|---|---|---|---|
| 2012/0242981 | A1* | 9/2012 | Wagner | G01N 21/43 356/128 |
| 2014/0104601 | A1* | 4/2014 | Baba | G01N 21/4133 356/135 |
| 2016/0290925 | A1 | 10/2016 | Takahashi | |
| 2016/0349157 | A1* | 12/2016 | Brown | G01N 21/43 |
| 2018/0267007 | A1* | 9/2018 | Laflamme | G01N 21/33 |
| 2021/0259586 | A1* | 8/2021 | Oba | A61B 5/14532 |
| 2022/0111456 | A1* | 4/2022 | Yamada | B23H 7/36 |

FOREIGN PATENT DOCUMENTS

| | | | | | |
|---|---|---|---|---|---|
| GB | 2503466 | A | * | 1/2014 | G01K 11/3206 |
| JP | 59-154339 | A | | 9/1984 | |
| JP | 62-12840 | A | | 1/1987 | |
| JP | 4-184151 | A | | 7/1992 | |
| JP | 8-166345 | A | | 6/1996 | |
| JP | 2001242079 | A | | 9/2001 | |
| JP | 2004271360 | A | | 9/2004 | |
| JP | 2005345175 | A | | 12/2005 | |
| JP | 2006242912 | A | * | 9/2006 | G01N 21/05 |
| JP | 2009047436 | A | | 3/2009 | |
| JP | 2016217734 | A | | 12/2016 | |
| JP | 2018511807 | A | | 4/2018 | |
| KR | 20210033712 | A | * | 3/2021 | A61B 5/6887 |

* cited by examiner

REFRACTIVE-INDEX CONCENTRATION SENSOR

CROSS-REFERENCE TO RELATED APPLICATIONS

The present application claims foreign priority based on Japanese Patent Application No. 2021-141876, filed Aug. 31, 2021, the contents of which are incorporated herein by reference.

BACKGROUND OF THE INVENTION

1. Field of the Invention

When the concentration of a fluid changes, a refractive index of the fluid changes. The invention relates to a refractive-index concentration sensor using such a characteristic.

2. Description of Related Art

The inventors have conceived the invention in the course of development to optimize ultrasonic flow detection devices including an ultrasonic flow switch, a concentration sensor, and a temperature sensor for control of a coolant of a machine tool.

First, the ultrasonic flow switch will be described for convenience of the description. An ultrasonic flow switch that outputs an ON/OFF signal is used at a site where it is sufficient to detect whether a fluid is flowing in a pipe at a flow rate equal to or higher than a certain value, in other words, at the site where an accurate flow rate value of the fluid flowing in the pipe is not required (JP 2016-217734 A). JP 2016-217734 A also discloses a clamp-on ultrasonic flow switch. The clamp-on ultrasonic flow switch is installed by retrofitting a unit incorporating elements included therein at an appropriate location on an outer circumferential surface of the pipe.

Next, a conventional refractive-index concentration sensor will be described. JP 2005-345175 A discloses a refractive-index concentration sensor. A structure of a refractive-index concentration sensor 2 disclosed in JP 2005-345175 A will be described hereinafter with reference to FIG. 2 of JP 2005-345175 A. Reference numerals used in this description are reference numerals described in JP 2005-345175 A. The refractive-index concentration sensor 2 includes a rectangular prism 22. A light projector 23 is arranged on an inclined surface 22*c* on one side of the rectangular prism 22. An object to be measured is positioned in contact with a bottom surface 22*a* of the rectangular prism 22. Alight receiver 24 is arranged on an inclined surface 22*d* on the other side of the rectangular prism 22.

The light projector 23 includes a plurality of arrayed LEDs 25 and a diffusion plate 26 arranged between the plurality of LEDs 25 and the prism 22. On the other hand, the light receiver includes a lens 27 and an imaging element (CCD) 28. That is, the refractive-index concentration sensor 2 of JP 2005-345175 A is characterized in that an array light source is employed as a light source of the light projector, and light emitted from the array light source is diffused by the diffusion plate to shine the light into the prism.

JP 2004-271360 A discloses another refractive-index concentration sensor. A structure of a refractive-index concentration sensor 10 disclosed in JP 2004-271360 A will be described hereinafter with reference to FIG. 1 of JP 2004-271360 A. Reference numerals used in this description are reference numerals described in JP 2004-271360 A. In the refractive-index concentration sensor 10, a light projector is arranged on a first surface 20 side of a prism 16, and a measurement target liquid is positioned in contact with a second surface 18 of the prism 16. Alight receiver is arranged on a third surface 22 side.

A light projector includes a light source 24 and a condenser lens 26 that collects light from the light source 24 onto the first surface 20. On the other hand, the light receiver preferably includes a polarizing plate 30 installed on the third surface 22. The polarizing plate 30 selectively allows passage of only S-polarized light vibrating in a direction orthogonal to a refractive index measurement surface. In other words, the polarizing plate 30 has a function of blocking P-polarized light of external light. The light receiver also includes an imaging element 28 and an objective lens 32 arranged between the polarizing plate 30 and the imaging element 28.

An arithmetic unit that calculates a critical angle and a refractive index of the measurement target liquid from a light amount distribution curve is connected to the imaging element 28.

The conventional refractive-index concentration sensor (JP 2005-345175 A) adopts a combination of the array light source and the diffusion plate in order to uniformly shine the light into the inclined surface on a light projection side of the rectangular prism. However, the array light source is an aggregate of the plurality of LEDs, and includes manufacturing variations of the respective LEDs. Therefore, the array light source is non-uniform in each local area when being regarded as a surface light source, and it is difficult to secure high uniformity even if non-uniform light in each local area is shone into the inclined surface of the light projection side of the rectangular prism through the diffusion plate. This means that unevenness occurs in the amount of light reception of the imaging element (CCD), and relates to the accuracy in concentration detection.

SUMMARY OF THE INVENTION

An object of the invention is to provide a refractive-index concentration sensor capable of performing highly accurate concentration detection even if dirt in a liquid adheres.

The above technical object is achieved by providing a refractive-index concentration sensor according to one embodiment of the invention, the refractive-index concentration sensor including: a light source; a diffusion plate that diffuses light emitted from the light source; a prism that has a first surface to receive the light transmitted through the diffusion plate, a second surface to reflect the light in contact with a measurement target liquid, and a third surface to extract the reflected light; a light receiving lens that receives light received by the third surface of the prism; an imaging element that receives light of the light receiving lens; a holder that presses the prism from an inner side to an outer side; and a housing that accommodates the light source, the diffusion plate, the light receiving lens, the imaging element, and the holder, and engages with and accommodates the prism to expose the second surface.

According to the embodiment of the invention, a detection surface of the prism is exposed from the housing in a state where the prism is pressed from the inner side to the outer side of the housing to enhance the adhesion between the housing and the prism. The prism is not attached from the outside of the housing, but is attached from the inside to improve waterproofness. When the prism and the housing are flush with each other, dirt is less likely to be attached.

According to another embodiment of the invention, a combination with a diffusion plate that diffuses light of a light source is adopted. In the invention, light from a light source is converted into substantially parallel light (collimated light) by a light projecting lens, and then, emitted to the diffusion plate. That is, the light projecting lens included in the invention is typically configured using a collimator lens. The light that has passed through the diffusion plate becomes diffused light starting from the diffusion plate, and the diffused light does not have a specific angular component. In other words, at each point of the diffusion plate, the light is converted into light having a plurality of angular components. As a result, a region included in the diffusion plate, that is, the region irradiated with the substantially parallel light through the light projecting lens can constitute a uniform surface light source.

As a result, even if the dirt in the liquid adheres, the concentration can be detected with high accuracy.

Operational effects of the invention and other objects of the invention will be apparent from the following detailed description of embodiments.

BRIEF DESCRIPTION OF THE DRAWINGS

FIG. 15 is a cross-sectional view for illustrating an internal structure of the pipe type concentration sensor illustrated in FIG. 10 and the like;

DETAILED DESCRIPTION OF PREFERRED EMBODIMENTS

Embodiment

Before describing a refractive-index concentration sensor of an embodiment, an ultrasonic flow detection device optimized for control of a coolant of a machine tool will be described. The ultrasonic flow detection device includes an ultrasonic flow switch, a concentration sensor, and a temperature sensor. As the ultrasonic flow switch, an integrated clamp-on ultrasonic flow switch having a display function is adopted.

The machine tool uses a water-soluble cutting oil diluted with water. A diluent of the water-soluble cutting oil is called "coolant". The amount of an active component of the coolant is small, and it is important to maintain the concentration of the coolant at an appropriate value in order to exert a lubricating effect by such a trace component, suppress decay of the coolant, suppress generation of rust, and suppress deterioration of cutting performance. If the concentration is lower than a recommended value, the machining performance of the machine tool deteriorates. An operator of the machine tool learns proper control of the coolant as a skill for improving production quality, reducing running cost, and improving work efficiency. For the operator, the proper control of the coolant, particularly concentration control, is important for improving the production quality of the machine tool, reducing the running cost, improving the work efficiency, and the like.

Figure 1:
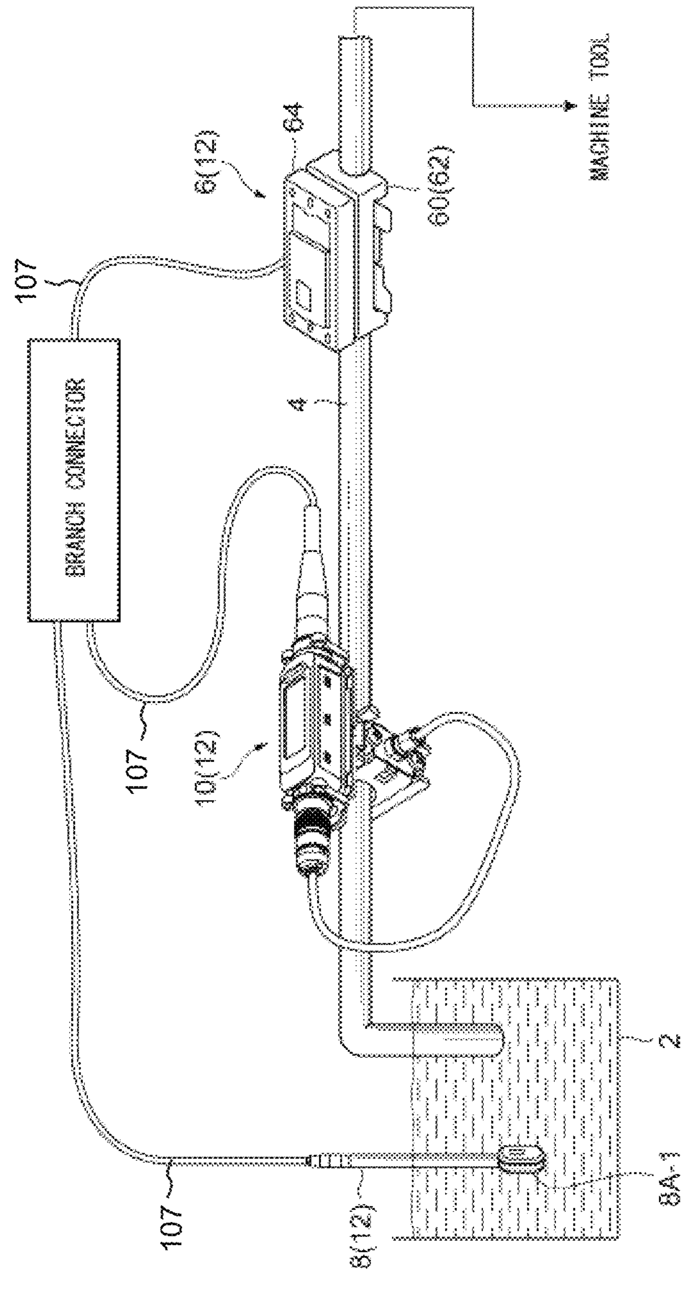
FIG. 1 is an overall configuration diagram of an ultrasonic flow detection device to which a refractive-index concentration sensor of an embodiment is preferably applied.

Referring to FIG. 1, reference numeral 2 denotes a coolant storage tank. The coolant storage tank 2 stores the water-soluble cutting oil diluted with water, that is, the coolant. The coolant in the coolant storage tank 2 is supplied to the machine tool (not illustrated) through a pipe 4.

A clamp-on ultrasonic flow switch 6 is detachably fixed to the pipe 4 by retrofitting. Further, the clamp-on ultrasonic flow switch 6 is connected to, for example, a concentration sensor 8 with a detection unit being inserted into the coolant storage tank 2, and is connected to, for example, a temperature sensor 10 installed in a connecting part of the pipe 4. The clamp-on ultrasonic flow switch 6 has a display 64 to be described later, and these elements constitute an ultrasonic flow detection device 12.

Figure 2:
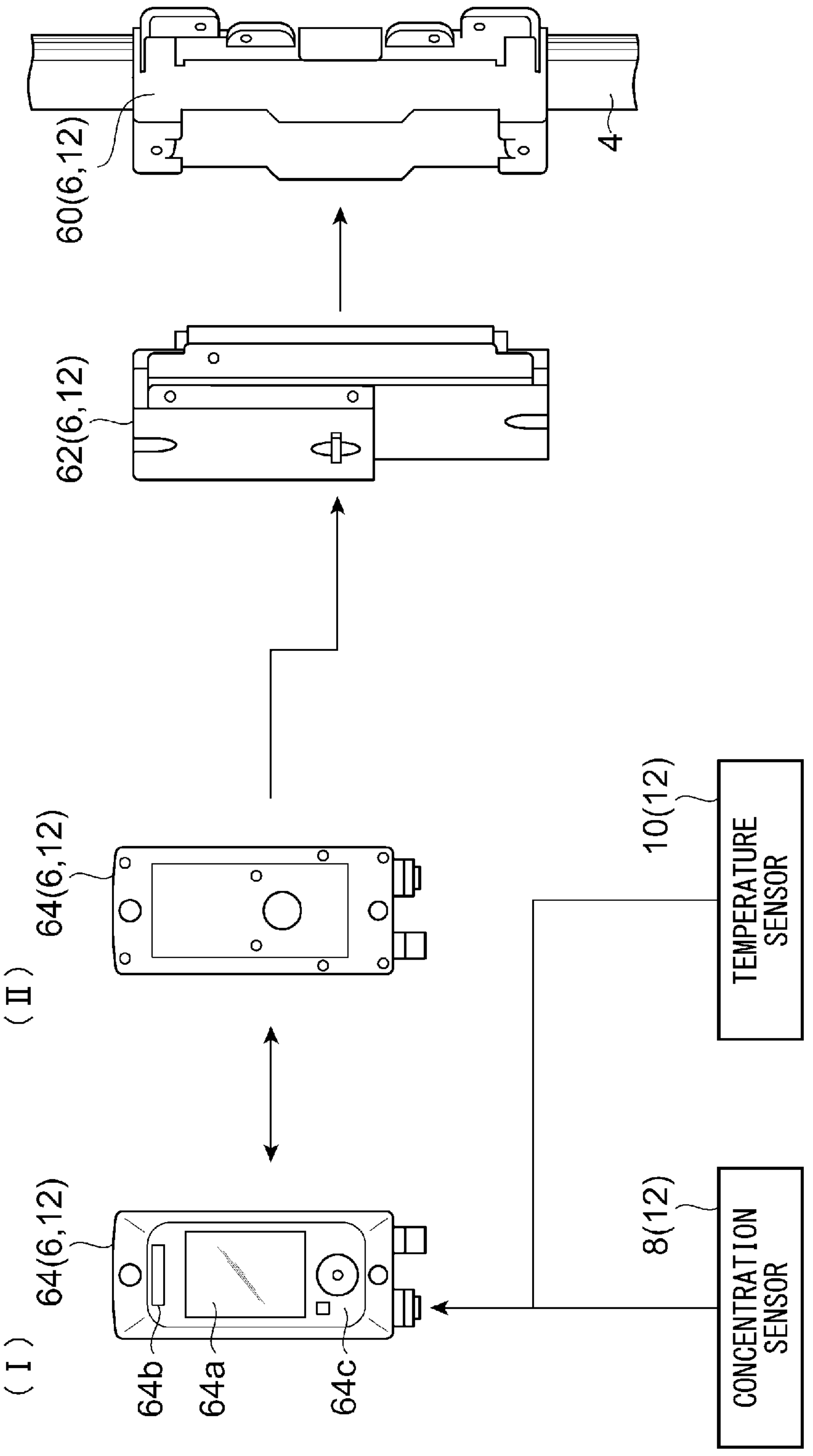
FIG. 2 is a view for describing a configuration of a clamp-on ultrasonic flow switch provided in the ultrasonic flow detection device illustrated in FIG. 1.

FIG. 2 is a view for describing a specific example of the clamp-on ultrasonic flow switch 6. The clamp-on ultrasonic flow switch 6 includes three members of an attachment base member 60, a measurement head member 62, and the display 64. The attachment base member 60 can be installed at an appropriate position of the pipe 4 in a retrofitted and detachable manner. The measurement head member 62 includes first and second ultrasonic elements 66 and 68 constituting a flow rate detection unit (FIG. 3), the measurement head member 62 is detachably assembled to the attachment base member 60, and a state in which the measurement head member 62 is in pressure contact with the pipe 4 is maintained by the attachment base member 60.

The display 64 is assembled to the measurement head member 62. In FIG. 2, (I) is a front view of the display 64, and (II) is a rear view of the display 64. The concentration sensor 8 and the temperature sensor 10 are connected to the display 64. Detection values detected by the concentration sensor 8 and the temperature sensor 10 are displayed on the display 64 without processing such as a calculation.

Figure 3:
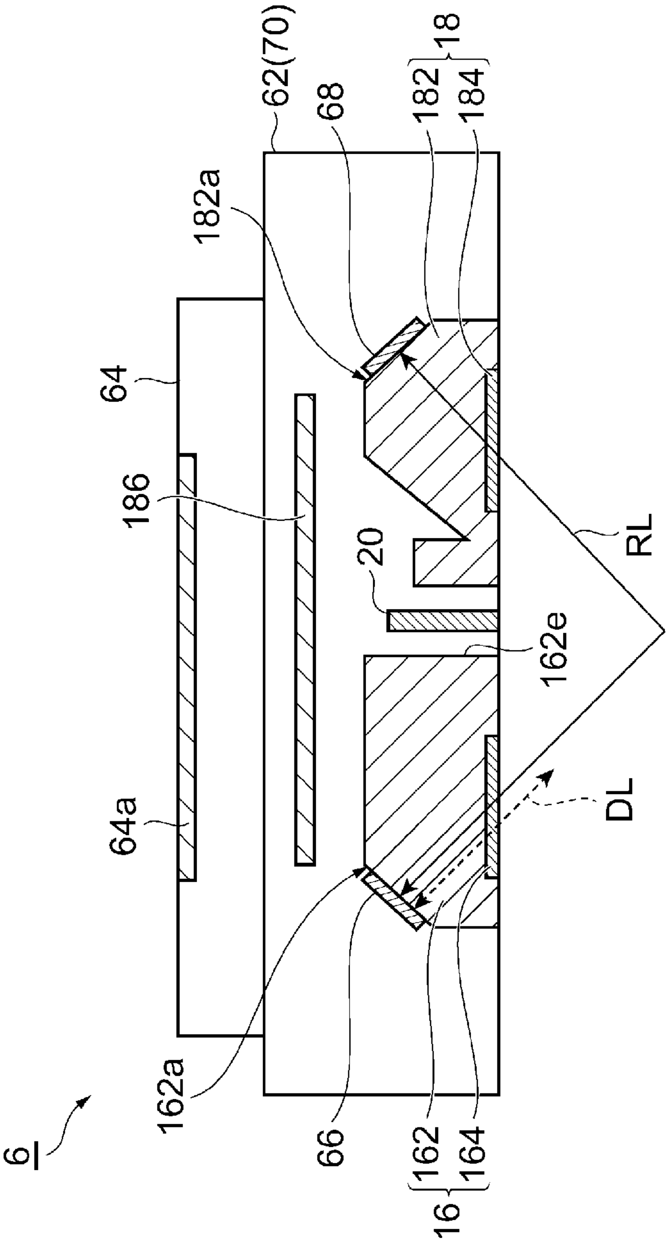
FIG. 3 is a view for describing functions of first and second ultrasonic elements applied to a Doppler measurement operation mode and a time difference measurement operation mode switchable in the clamp-on ultrasonic flow switch illustrated in FIG. 2.

The clamp-on ultrasonic flow switch 6 is most preferably configured using the integrated clamp-on ultrasonic flow switch (FIG. 3). It is preferable that the first ultrasonic element 66 and the second ultrasonic element 68 be integrally held by one element holding part 70 in the measurement head member 62.

Referring to FIG. 3, the measurement head member 62 incorporates the first and second ultrasonic elements 66 and 68 that transmit and receive ultrasonic waves, and relative positions of the first and second ultrasonic elements 66 and 68 are fixed by the element holding part 70. The first and second ultrasonic elements 66 and 68 are typically configured using piezoelectric elements. The first and second ultrasonic elements 66 and 68 are positioned on the element holding part 70 so as to be spaced apart from each other in an axial direction of the pipe on a generatrix of the pipe 4. The integrated clamp-on ultrasonic flow switch 6 is a so-called V arrangement system or a reflection arrangement system when specified from the viewpoint of a time difference operation mode in which measurement is performed under the principle of a “propagation time difference” system to be described later.

A first wedge member 162 as a first ultrasonic wave transmitting unit 16 is provided adjacent to the first ultrasonic element 66 included in the measurement head member 62, and a second wedge member 182 as a second ultrasonic wave transmitting unit 18 is provided adjacent to the second ultrasonic element 68. The first wedge member 162 has a first element coupling surface 162*a* that is incorporated in the element holding part 70 and supports the first ultrasonic element 66 so as to be acoustically coupled to the first ultrasonic element 66, and the first ultrasonic element 66 is installed on the first element coupling surface 162*a*. The second wedge member 182 has a second element coupling surface 182*a* that is incorporated in the element holding part 70 and supports the second ultrasonic element 68 so as to be acoustically coupled to the second ultrasonic element 68, and the second ultrasonic element 68 is installed on the second element coupling surface 182*a*.

In addition, the measurement head member 62 preferably includes first and second couplants 164 and 184 adjacent to the first and second wedge members 162 and 182, respectively. The first and second couplants 164 and 184 constitute parts of the first and second ultrasonic wave transmitting units 16 and 18, respectively, and constitute a pipe coupling surface that is acoustically coupled to the pipe 4 in the element holding part 70.

The measurement head member 62 includes a circuit board 186 that controls transmission and reception of the first and second ultrasonic elements 66 and 68 and calculates detection data. As described above, the display 64 is detachably installed on the measurement head member 62. The display 64 includes a display unit 64*a*.

The display 64 receives a flow rate obtained by the measurement head member 62 and displays the flow rate on the display unit 64*a*.

The measurement head member 62 includes a time difference measurement operation mode in which the first and second ultrasonic elements 66 and 68 cooperate to perform flow rate measurement in the “propagation time difference” system and a Doppler measurement operation mode in which the first ultrasonic element 66 operates alone to perform flow measurement in a “pulse-Doppler” system, and these modes are selected by a user or are automatically used in accordance with, for example, the amount of air bubbles in a fluid. For example, the measurement head member 62 operates alternately in the time difference measurement operation mode and the Doppler measurement operation mode, and the Doppler measurement operation mode is automatically set when there are many air bubbles, and the time difference measurement operation mode is automatically set when there are few air bubbles.

In FIG. 3, an arrow of a solid line RL indicates that the first and second ultrasonic elements 66 and 68 cooperate to measure the flow rate under the principle of the “propagation time difference” system. On the other hand, an arrow of a broken line DL indicates that the first ultrasonic element 66 operates alone to measure the flow rate under the principle of the “pulse-Doppler” system.

Regarding the concentration sensor 8 described above with reference to FIG. 1, two types of refractive-index concentration sensors are prepared. One is a probe type, and the concentration sensor 8 exemplarily illustrated in FIG. 1 is the probe type. The other is a pipe type. When it is necessary to distinguish the probe type and the pipe type from each other, the probe type concentration sensor is denoted by reference numeral 8A, and the pipe type concentration sensor is denoted by reference numeral 8B.

Figure 4:
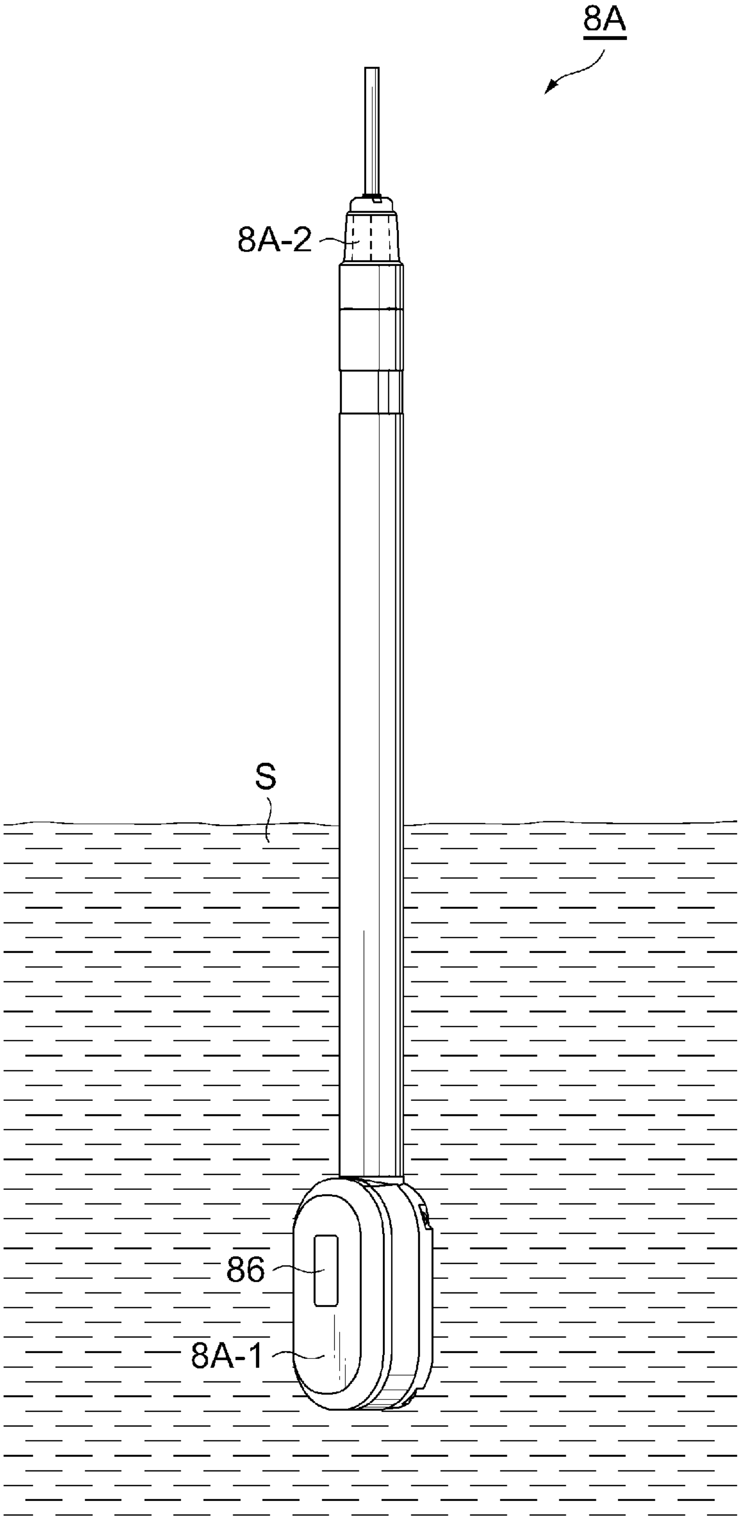
FIG. 4 is a perspective view of a probe type concentration sensor as an example of the refractive-index concentration sensor included in the ultrasonic flow detection device.

FIG. 4 is a perspective view of the probe type concentration sensor 8A. The probe type concentration sensor 8A has a rod-like shape according to a housing, and is used in a state in which a detection unit 8A-1 is inserted into a measurement target liquid in the tank 2 with the detection unit 8A-1 facing down as described with reference to FIG. 1. The housing of the probe type concentration sensor 8A is preferably made of metal. Reference numeral 8A-2 in FIG. 4 denotes a display lamp.

The probe type concentration sensor 8A has a rod-like elongated shape, the detection unit 8A-1 is arranged at one end in the longitudinal direction, and the display lamp 8A-2 is provided at the other end. The display lamp 8A-2 is turned on or off when the detected concentration exceeds a threshold set in the probe type concentration sensor 8A. The display lamp 8A-2 arranged on a side opposite to the detection unit 8A-1 in the longitudinal direction enables lighting and blinking thereof to be visually recognized over the entire circumference, and is located above the liquid level of the liquid during the operation of the probe type concentration sensor 8A, and thus, is easily visually recognized.

When the display lamp 8A-2 is described in detail, the display lamp 8A-2 that emits light over the entire circumference includes LEDs (Green and Red) of two colors of red and green, and implements lighting with amber light in which both green and red are turned on as a lighting pattern. Any color LED to be turned on, turned off, or lighted to blink is changed depending on a state of the concentration sensor. For example, regarding the green LED and the red LED in the display lamp 8A-2, the green LED is turned on when the concentration is within a predetermined range, and the red LED is turned on when the concentration is out of the predetermined range. When the tank is dried up, the red is lighted to blink. For example, lighting or blinking of the display lamp 8A-2 in amber color notifies the user of maintenance time. In addition, when a detection window is dirty, the amber blinking enables the user to recognize that a state is different from states indicated by green and red.

In addition, the display lamp 8A-2 is arranged at a portion close to a housing cable, most preferably at an end, of the probe type concentration sensor 8A and has a truncated cone shape. Thus, the display lamp 8A-2 is visually recognized from all directions of the circumference of 360 degrees, and is arranged above the liquid level of the tank 2, and thus, is visually recognized even from above the tank 2.

Figure 5:
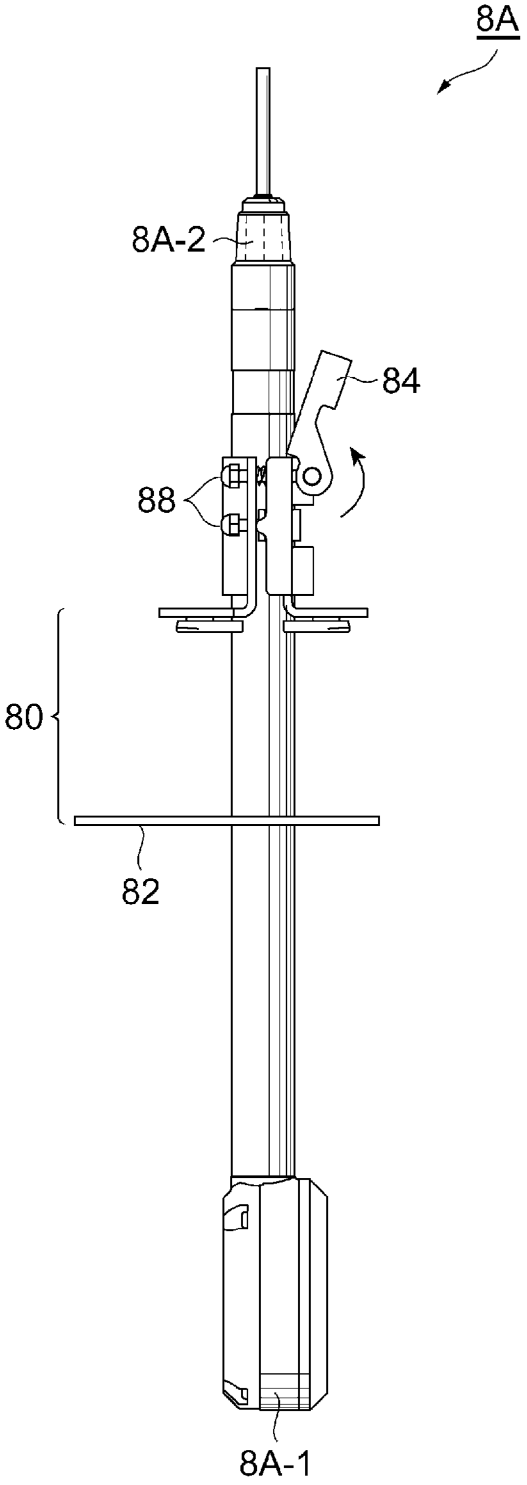
FIG. 5 is a side view for describing a jig used at the time of installing a detection unit of the probe type concentration sensor of FIG. 4, for example, in a state of being inserted into a tank, and illustrates a state before the probe type concentration sensor is fixed to the tank.
Figure 6:
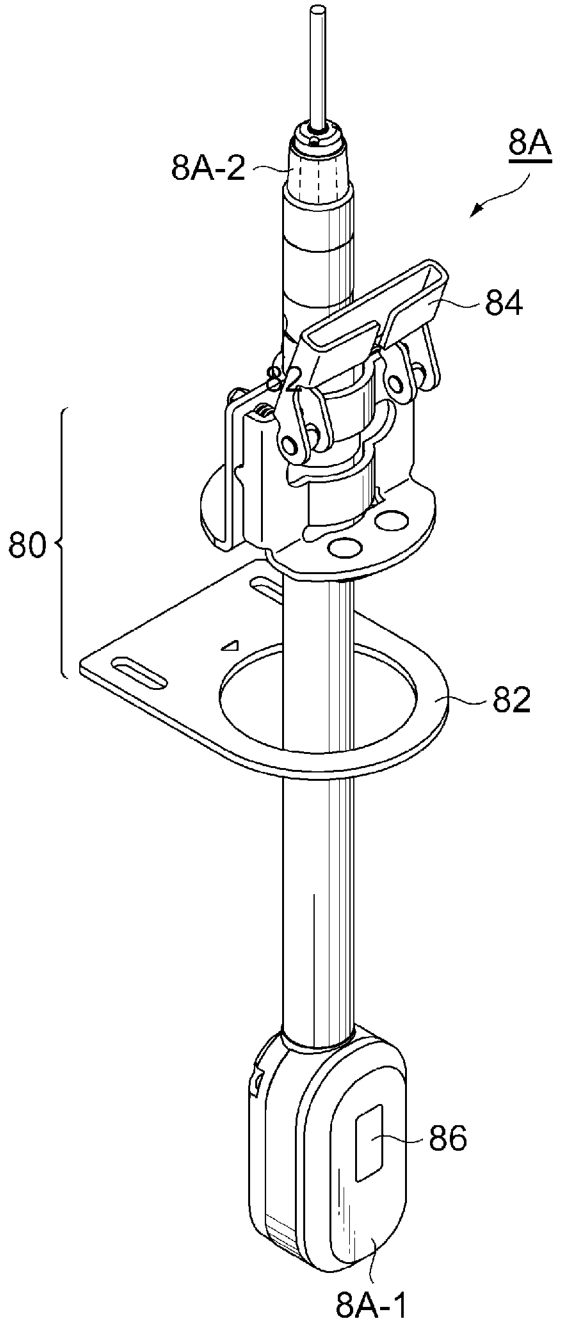
FIG. 6 is a perspective view of the probe type concentration sensor and the jig illustrated in FIG. 5.
Figure 7:
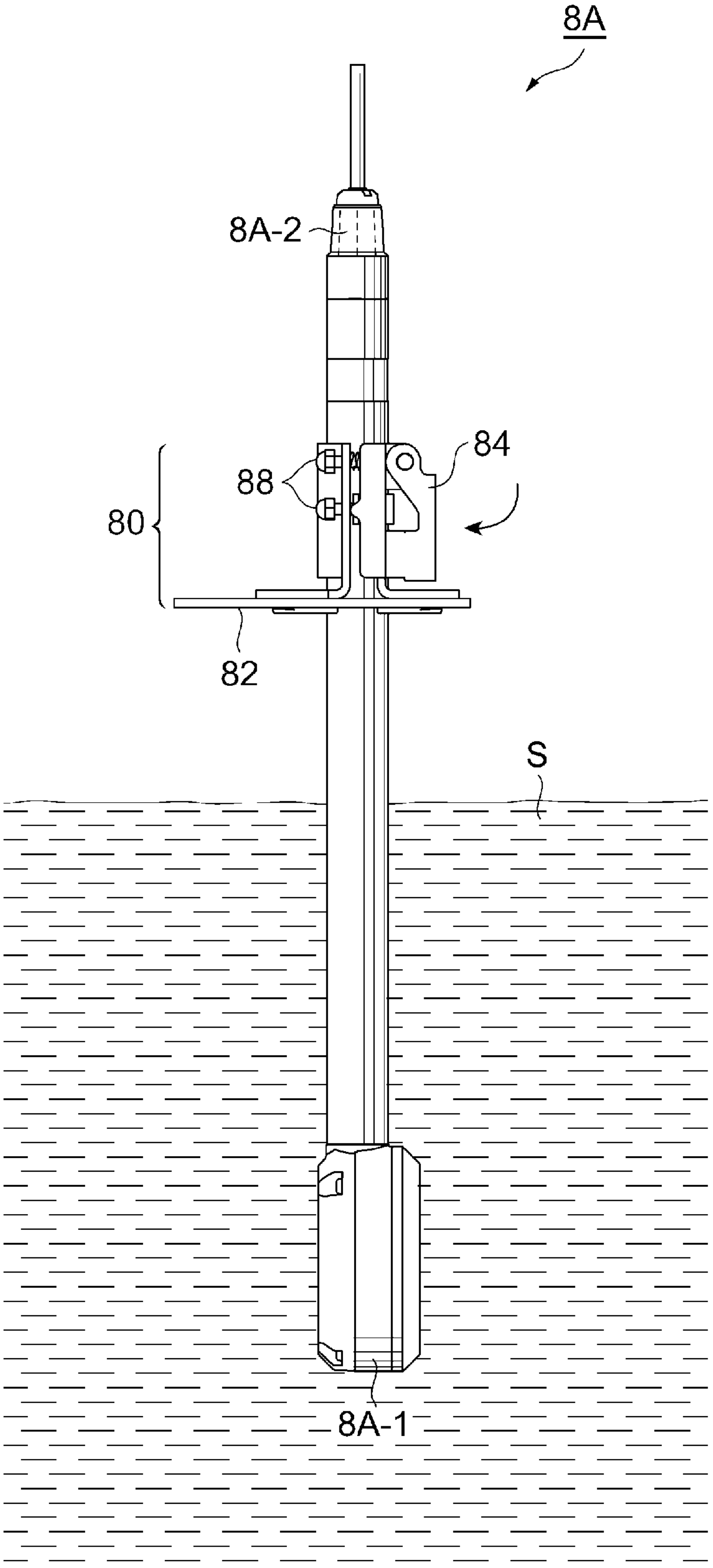
FIG. 7 is a side view illustrating a state in which the probe type concentration sensor is fixed to the tank using the jig in relation to FIG. 5.
Figure 8:
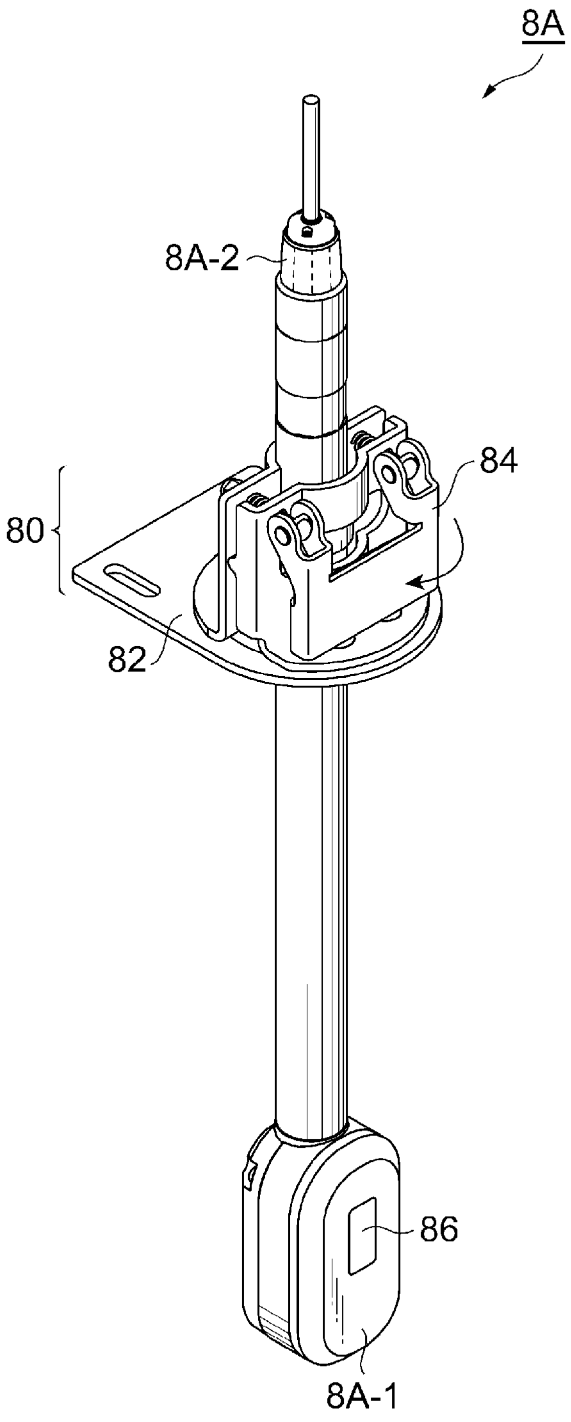
FIG. 8 is a perspective view related to FIG. 7.

FIGS. 5 and 6 are explanatory views illustrating installation of the probe type concentration sensor 8A using a jig 80, and illustrate a process of inserting the detection unit 8A-1 of the probe type concentration sensor 8A into the tank 2. FIG. 5 is a side view in which the jig of the probe type concentration sensor 8A is in an unlocked state. FIG. 6 is a perspective view corresponding to FIG. 5. FIGS. 7 and 8 illustrate a state in which the probe type concentration sensor 8A is fixed to, for example, the tank 2 using the jig 80. FIG. 7 is a side view in which the jig of the probe type concentration sensor 8A is in a locked state. FIG. 8 is a perspective view corresponding to FIG. 7.

The jig 80 includes, for example, a pedestal plate 82 installed in an opening of the tank 2, and includes a lever fixture 84 that is detachably installed on the probe type concentration sensor 8A. The fixture 84 is detachably fixed to the concentration sensor 8A by a bolt 88.

Referring to FIGS. 5 and 6, the detection unit 8A-1 of the probe type concentration sensor 8A is inserted into a measurement target liquid S in the tank 2 or removed from the tank 2 with the lever fixture 84 being in an unlocked state. Referring to FIGS. 7 and 8, the probe type concentration sensor 8A is fixed to the tank 2 as the user pushes down the lever fixture 84 to be in a locked state. The detection unit 8A-1 of the probe type concentration sensor 8A has a detection window 86 (FIG. 8), and the concentration of the measurement target liquid in the tank 2 is detected through the detection window 86. As can be seen from FIGS. 4 to 8, the detection unit 8A-1 of the probe type concentration sensor 8A is held in an attitude oriented in the lateral direction. As a result, the detection window 86 of the detection unit 8A-1 is configured using a surface extending in the vertical direction.

The display lamp 8A-2 can be visually recognized from the outside because the jig 80 is fixed on a side closer to the detection unit 8A-1 than the display lamp 8A-2, that is, an intermediate portion between the detection unit 8A-1 and the display lamp 8A-2 in the housing of the probe type concentration sensor 8A even when being attached.

Figure 9:
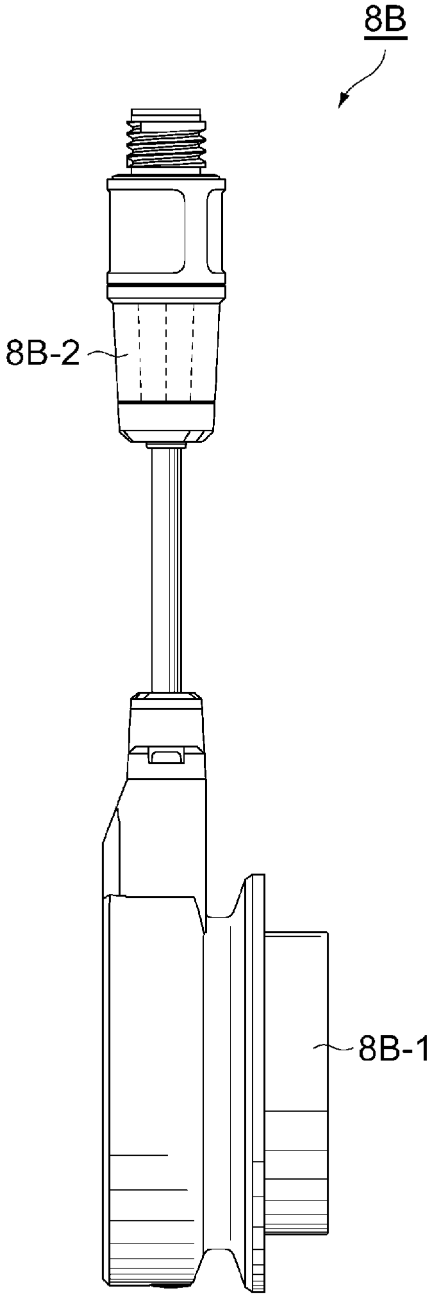
FIG. 9 is a side view of a pipe type concentration sensor as another example of the refractive-index concentration sensor included in the ultrasonic flow detection device.
Figure 10:
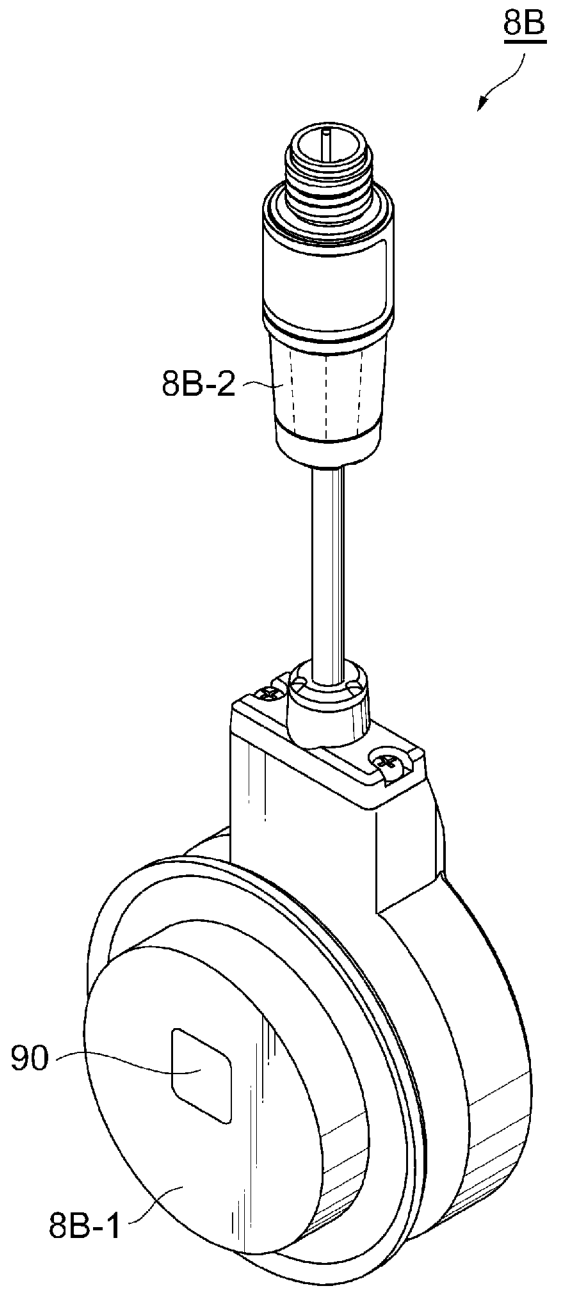
FIG. 10 is a perspective view of the pipe type concentration sensor illustrated in FIG. 9.
Figure 11:
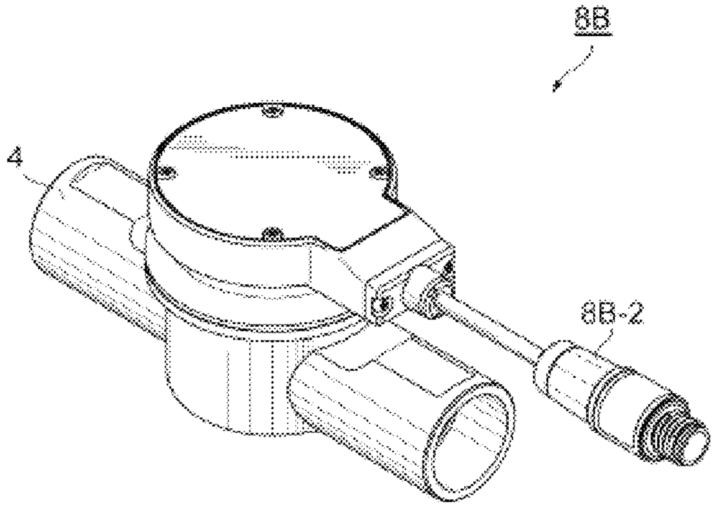
FIG. 11 is a perspective view of the pipe type concentration sensor installed in a pipe.
Figure 12:
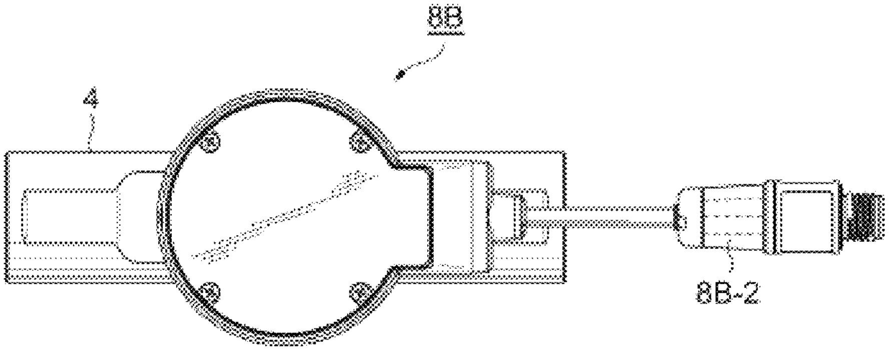
FIG. 12 is a plan view related to FIG. 11.
Figure 13:
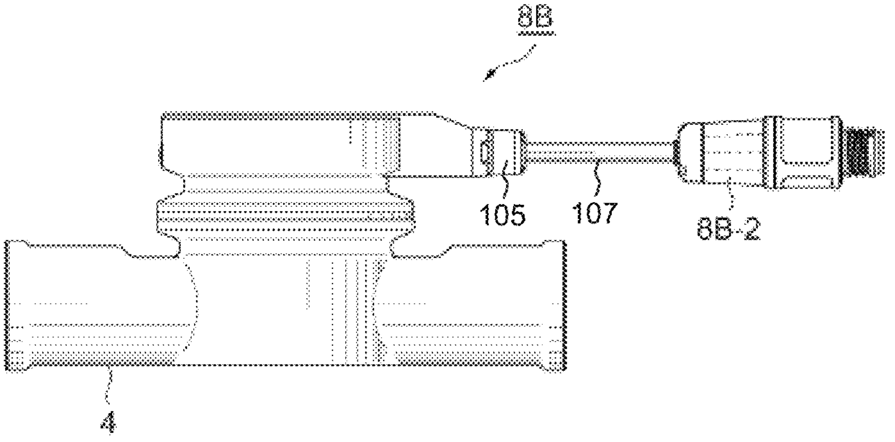
FIG. 13 is a side view related to FIGS. 11 and 12.

FIGS. 9 and 10 illustrate the pipe type concentration sensor 8B, FIG. 9 is a side view, and FIG. 10 is a perspective view. FIGS. 11 to 13 illustrate the pipe type concentration sensor 8B in a state of being incorporated in the pipe 4.

FIG. 11 is a perspective view, FIG. 12 is a plan view, and FIG. 13 is a side view.

The pipe type concentration sensor 8B is installed on the pipe 4 in a state in which a detection unit 8B-1 faces the inside of the pipe 4. Reference numeral 90 in FIG. 10 denotes a detection window of the pipe type concentration sensor 8B, the detection window 90 is located in the detection unit 8B-1, and the concentration of the measurement target liquid flowing through the pipe 4 is detected through the detection window 90. Reference numeral 8B-2 in FIG. 9 denotes a display lamp. The display lamp 8B-2 provided in the pipe type concentration sensor 8B is substantially the same as the display lamp 8A-2 of the probe type concentration sensor 8A described above in terms of a structure and a function. For example, the display lamp 8B-2 provided in the pipe type concentration sensor 8B can emit light in all directions of the circumference of 360 degrees, and lighting or blinking thereof can be visually recognized over the entire circumference, which is similar to the display lamp 8A-2 of the probe type concentration sensor 8A described above. Therefore, a detailed description of the display lamp 8B-2 provided in the pipe type concentration sensor 8B will be omitted.

In the pipe type concentration sensor 8B, the display lamp 8B-2 is connected by a cable 107 to a cable connector unit 105, that is, a terminal of the pipe type concentration sensor 8B, and is arranged on the detection unit 8B-1 side of the connector unit, that is, the terminal, and the display lamp 8B-2 has a truncated cone shape. A housing of the pipe type concentration sensor 8B is preferably made of metal similarly to the housing of the probe type concentration sensor 8A.

Figure 14:
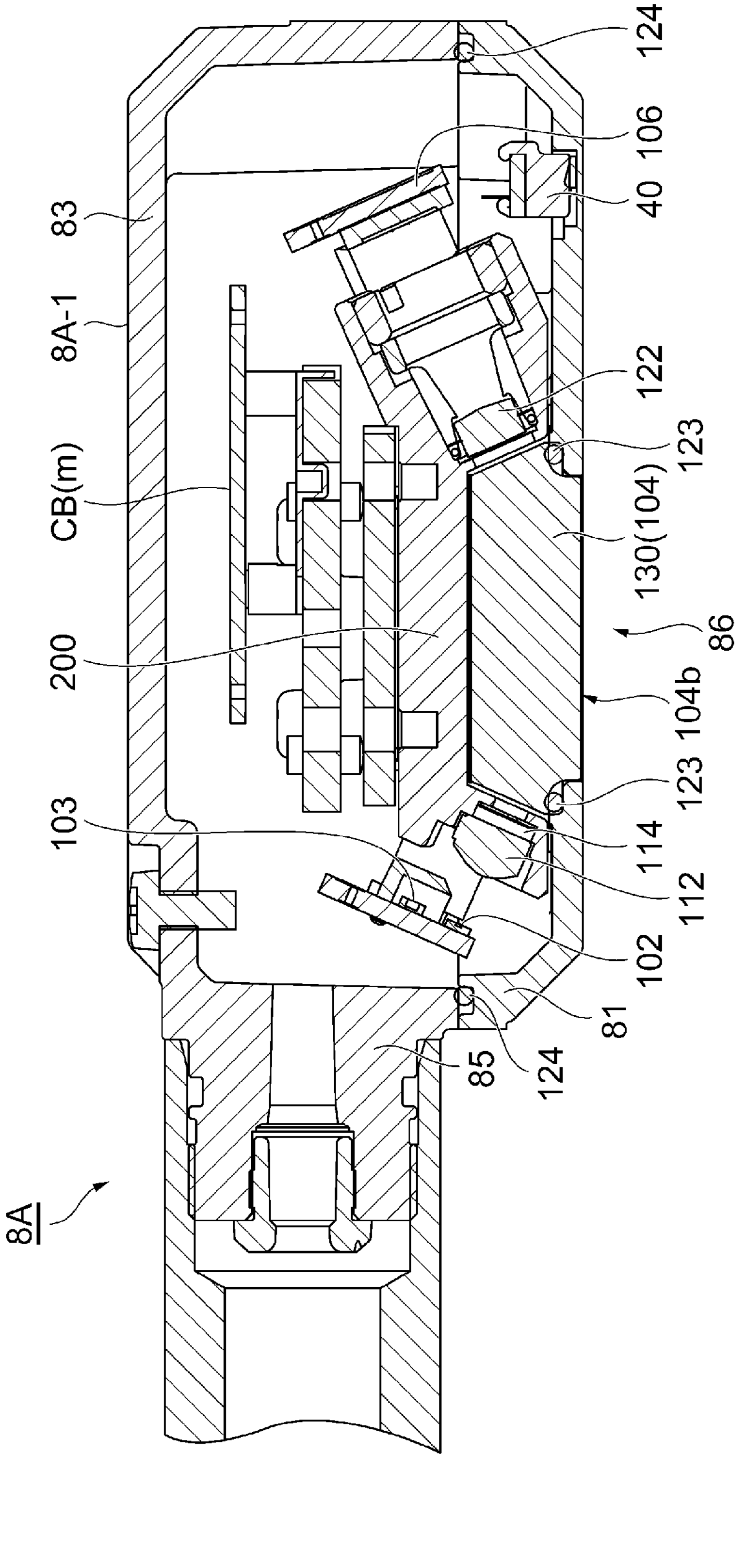
FIG. 14 is a cross-sectional view for illustrating an internal structure of the probe type concentration sensor illustrated in FIG. 4.

FIG. 14 is a view for describing a structure of the detection unit 8A-1 of the probe type concentration sensor 8A. As illustrated in FIG. 14, an LED light source 102, a monitoring PD 103 for light amount control, a light projecting lens 112, and a diffusion plate 114, which will be described later, are modularized, and are attached to and incorporated in a holder 200 as a light projecting module. Similarly, an imaging element 106 and a light receiving lens 122 are also modularized and attached to and incorporated in the holder 200 as a light receiving module. The detection window 86 is provided in a metal housing 81 of the probe type concentration sensor 8A. The light projecting module including the elements 102, 112, and 114, the light receiving module including the elements 106 and 122, and a main board CB(m) are assembled to a pressing member 200. Then, the pressing member on which the respective elements are mounted, that is, the holder 200 is installed in relation to the prism 130, and then, the whole thereof is pressed against and fixed to the metal housing 81. At that time, a first packing 123, made of rubber as a water-blocking member, is interposed between a circumferential eave of the prism 130, that is, a stepped part extending in the circumferential direction, and the metal housing 81. The first packing 123 is crushed by being pressed against and fixed to the metal housing 81, thereby preventing water from entering the housing 81 from the outside. The metal housing 81 is partially thinned between the stepped part extending around the circumference of the prism 130, that is, the circumferential eave and a surface of the metal housing 81 to form a space for accommodating the first packing 123, whereby the detection window 86 that is flush is achieved as will be described later. In addition, the temperature sensor (temperature measurement circuit) 40 is provided on a distal side of the prism 130 in the detection unit 8A-1. In a portion where the temperature measurement circuit 40 is provided, the metal housing 81 is thinner than the other portion. The portion is thinner than a portion that is pressed by the prism 130 and thinned.

A second packing 124 as a water-blocking member is also interposed between the first housing 81 and a second housing 83 separate from the first housing, and the first housing 81 and the second housing 83 are pressed to crush the second packing 124, thereby preventing water from entering the inside of the probe type concentration sensor 8*a* from an interface portion, that is, a mating surface, between the first housing 81 and the second housing 83. After the first and second housings 81 and 83 are integrated, this assembly is inserted, fitted, and screwed into a third housing 85 to be fixed, thereby preventing the entry of water from an interface, that is, mating surface, between the second housing 83 and the third housing 85.

Figure 15:
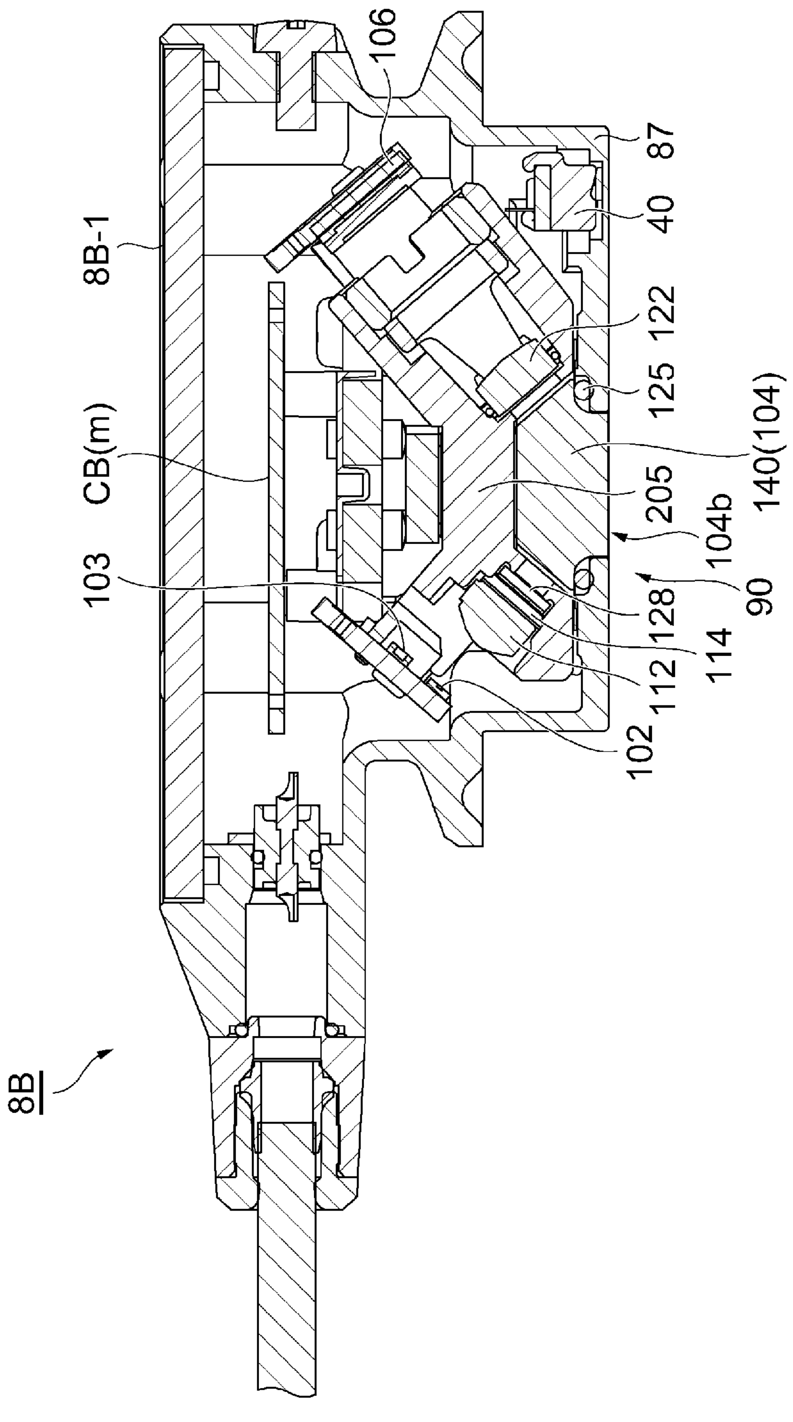

FIG. 15 is a view for describing a structure of the detection unit 8B-1 of the pipe type concentration sensor 8B. As illustrated in FIG. 15, the light projecting module (102 and 112), the light receiving module (106 and 122), and the main board CB(m) are assembled to a pressing member 205. Thereafter, the pressing member 205 on which the respective elements are mounted is attached to a prism 140, and the whole thereof is pressed against and fixed to a metal housing 87 having the detection window 90 of 8B. At that time, a packing 125, made of rubber as a water-blocking member, is interposed between a circumferential eave of the prism 140 and the metal housing 87.

As the packing 125 is crushed, water is prevented from entering the inside of the pipe type concentration sensor 8B from the outside of the housing 87. The metal housing 87 is partially thinned between a stepped part extending around the circumference of the prism 140, that is, the circumferential eave and a surface of the metal housing 81 to form a space for accommodating the packing 125, whereby the detection window 90 that is flush is achieved as will be described later. In addition, the temperature sensor (temperature measurement circuit) 40 is provided on a distal side of the prism 140 in the detection unit 8B-1. In a portion where the temperature measurement circuit 40 is provided, the metal housing 87 is thinner than the other portion.

Figure 16:
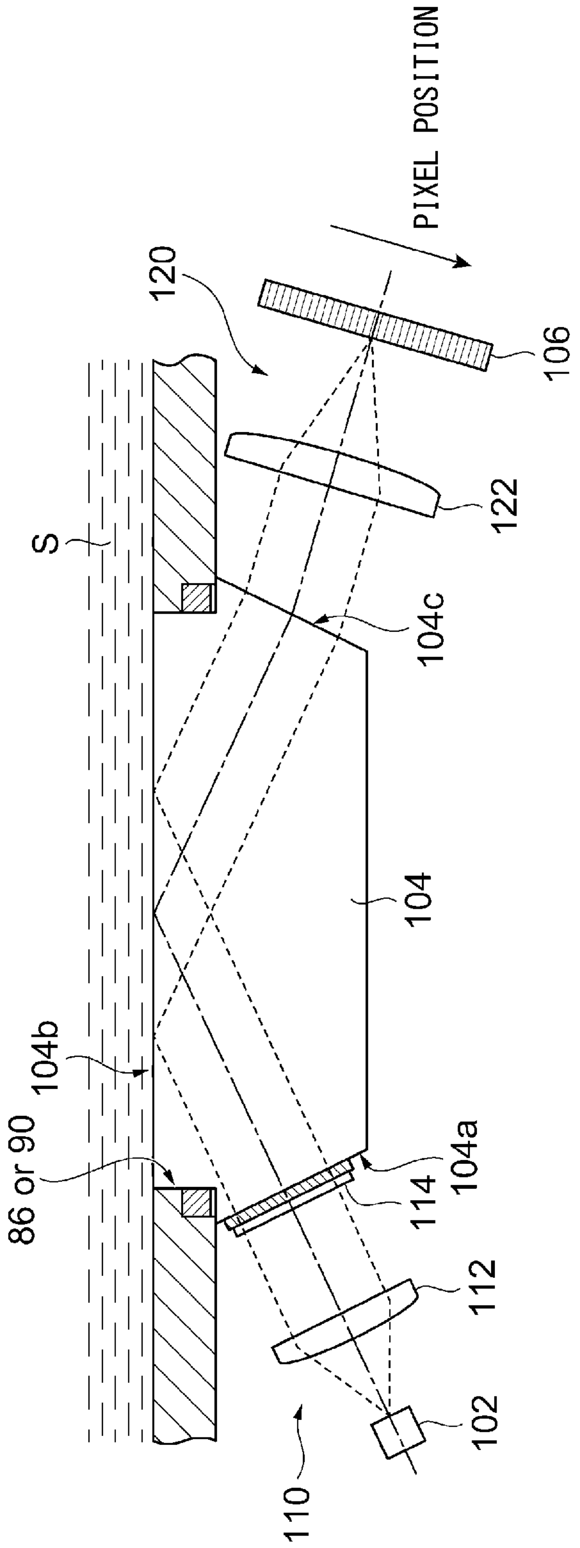
FIG. 16 is a view for describing an effect in a prism when a combination of a light projecting lens of a collimator lens and a diffusion plate that diffuses substantially parallel light from the light projecting lens is adopted as a light projector for the prism in a basic structure common to the probe type concentration sensor and the pipe type concentration sensor according to the embodiment.

The detection unit 8A-1 of the probe type and the detection unit 8B-1 of the pipe type basically have the same structure, and such a basic structure is illustrated in FIG. 16. The basic structure common to the probe type and the pipe type will be described with reference to FIG. 16. The basic structure common to the probe type concentration sensor 8A and the pipe type concentration sensor 8B includes the light source 102, a prism 104, and the imaging element 106. The light source 102 is configured using a single LED light source. As an example, the single LED of amber having a center wavelength of about 589 nm is used. The LED light source 102 forms a part of a light projector 110, and the light projector 110 irradiates a first surface 104*a* of the prism 104 with light. The light projector 110 located on an input side of the prism 104 includes at least the LED light source 102 and the diffusion plate 114. The light projector 110 includes a light projecting lens 112 that receives light from the LED light source 102 and preferably converts the light into substantially parallel light. The light projecting lens 112 is typically configured using a collimator lens. In addition, the light projector 110 further includes the diffusion plate 114 that diffuses the substantially parallel light generated by passing through the light projecting lens 112. The light that has passed through the diffusion plate 114 becomes diffused light starting from the diffusion plate 114, and the diffused light does not have a specific angular component. That is, the diffusion plate 114 converts the light into light having a plurality of angular components at points of diffusion plate 114. Thus, the diffusion plate 114 forms a uniform surface light source, and irradiates the first surface 104*a* of the prism 104. Referring to FIGS. 14 and 15, the monitoring PD 103 that monitors the amount of light emission of the LED light source 102 is provided adjacent to the LED light source 102 (see FIG. 19). The light received by the monitoring PD 103 is monitored, and a control unit controls the amount of light emission of the LED light source 102 such that the amount of light emission from the LED light source 102 becomes constant.

When the LED light source of amber having the center wavelength of about 589 nm is used, a temperature characteristic is not good as compared with other LEDs. In order to make the amount of light emission constant regardless of an ambient temperature including a temperature of the liquid, the amount of current to be supplied to the LED light source is controlled according to the amount of light emission by viewing the amount of light emission of the LED. The amount of current may be increased or decreased, or a duty ratio of the LED that performs pulsed lighting may be adjusted to adjust the amount of light emission to be constant.

A second surface 104*b* of the prism 104 faces the measurement target liquid through the detection window 86 or 90 and is in contact with the measurement target liquid. The light diffused by the diffusion plate 114 enters the inside of the prism 104 through the first surface 104*a*, is reflected by the second surface 104*b* in contact with the measurement target liquid, and the reflected light exits to the outside from the prism 104 through a third surface 104*c* on a side close to a light receiver 120. The light receiver 120 includes the light receiving lens 122 and the imaging element 106, and the reflected light that has exited to the outside of the prism 104 through the third surface 104*c* is collected by the light receiving lens 122, and the light collected by the light receiving lens 122 is input to the imaging element 106. The imaging element 106 is typically configured using a one-dimensional CMOS sensor. Total reflection light at an interface between the prism 104 and the target liquid is collected on the imaging element 106 by the light receiving lens 122 to acquire a light amount distribution. A change in a refractive index depending on the concentration of the liquid is measured as a change in a light collecting position on the imaging element 106. A change in the concentration and the change in the refractive index are in a proportional relationship, and the concentration of the target liquid can be measured by measuring the change in the refractive index.

The imaging element 106 is not constantly set to a light receiving state, but one set of ON and OFF of imaging in which imaging is performed a plurality of times at short intervals and then imaging is turned off for a long time thereafter is performed periodically to suppress heat generation from the imaging element 106. This suppresses a misalignment or the like of a substrate on which the imaging element 106 is mounted due to the heat generation from the imaging element 106. In the refractive-index concentration sensor, the concentration is measured from the light amount distribution of the imaging element 106, and thus, there is a problem in principle that even a slight misalignment of the substrate directly affects the accuracy in measurement of the concentration. On the other hand, heat generation on the imaging element 106 side is suppressed by periodically performing one set in which ON and OFF are periodically repeated in the temperature sensor for which constant measurement is required so as not to lower the accuracy in measurement of the concentration.

Figure 17:
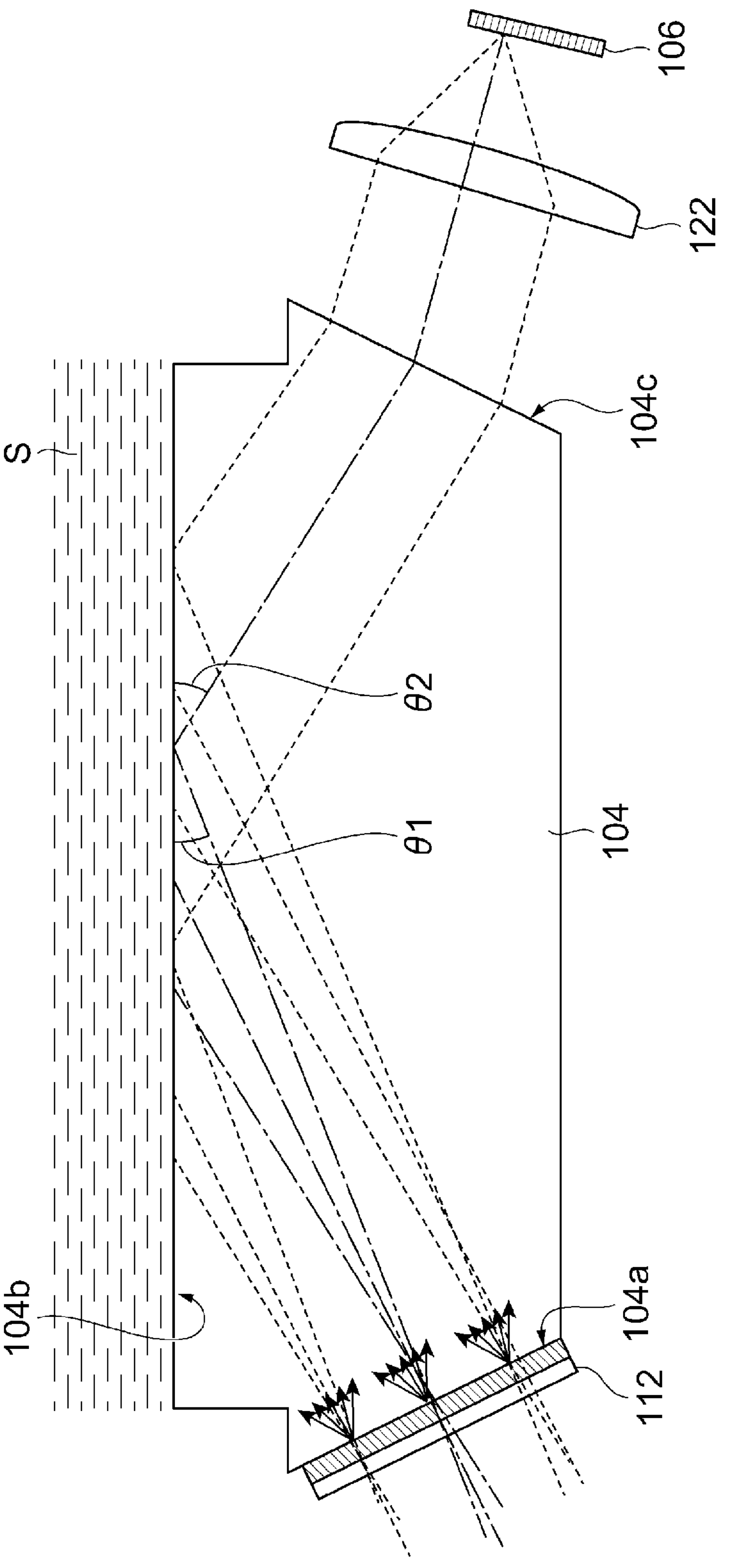
FIG. 17 is a view for describing that a refractive index changes depending on the concentration of a measurement target liquid and this change is sensed by an imaging element when the combination of the light projecting lens of the collimator lens and the diffusion plate that diffuses substantially parallel light from the light projecting lens is adopted as the light projector for the prism in the basic structure common to the probe type concentration sensor and the pipe type concentration sensor according to the embodiment.
Figure 18:
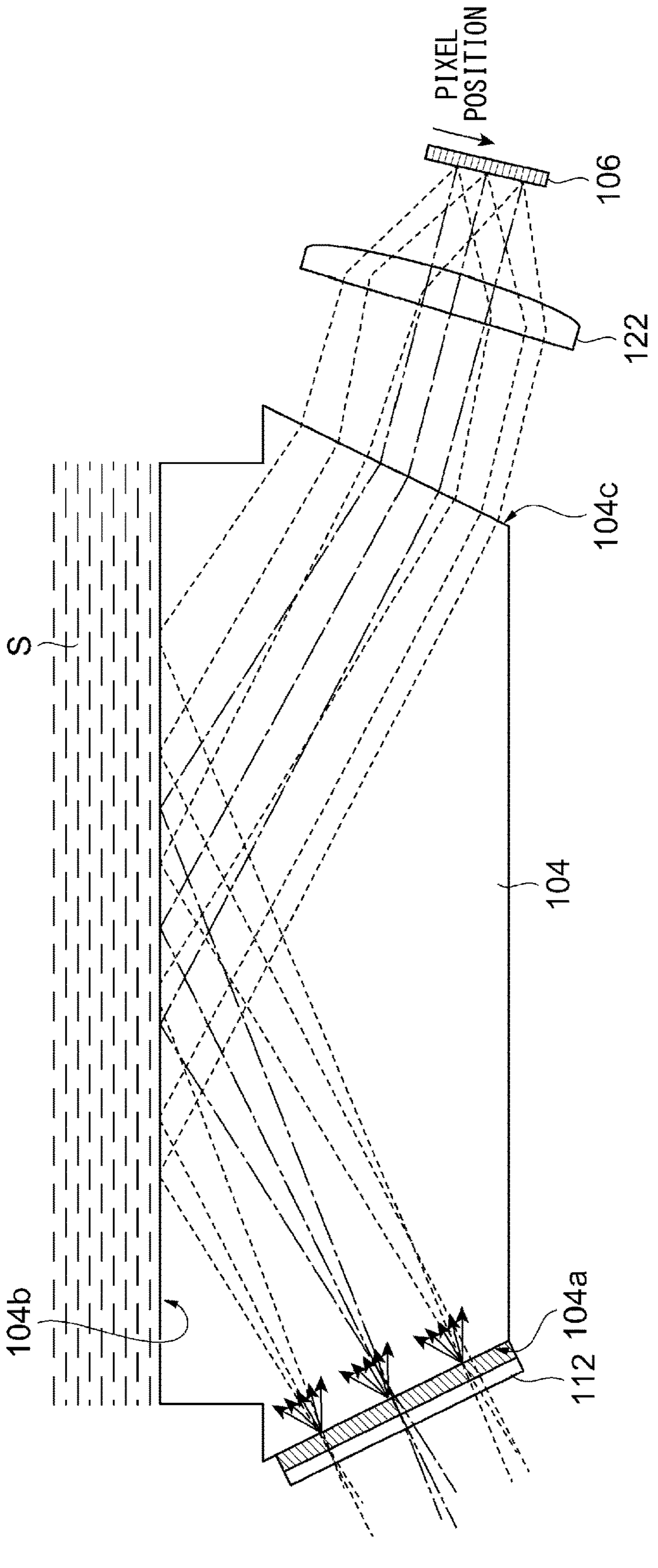
FIG. 18 is a view for describing that the refractive index changes depending on the concentration of the measurement target liquid and this change is sensed by the imaging element in the embodiment that adopts the combination of the light projecting lens of the collimator lens and the diffusion plate that diffuses substantially parallel light from the light projecting lens similarly to FIG. 17.

FIGS. 17 and 18 are views for describing that a refractive index on the second surface 104*b* in contact with the measurement target liquid S changes depending on the concentration of the measurement target liquid. Referring to FIG. 17, a ratio between an incident angle θ1 related to the second surface 104*b* and an exit angle θ2 of the reflected light on the second surface 104*b* is the refractive index, and this refractive index changes depending on the concentration of the measurement target liquid S. This change can be known by displacement of a site focused on the imaging element 106.

Returning to FIGS. 14 and 15, FIG. 14 illustrates a specific structure of the detection unit 8A-1 of the probe type concentration sensor 8A. FIG. 15 illustrates a specific structure of the detection unit 8B-1 of the pipe type concentration sensor 8B. In the specific structure, a difference between the probe type concentration sensor 8A and the pipe type concentration sensor 8B relates to a material of the prism 104. In the probe type illustrated in FIG. 14, the quartz prism 130 is adopted as the prism 104. In the pipe type illustrated in FIG. 15, the sapphire prism 140 is adopted as the prism 104. In FIGS. 14 and 15, reference numeral CB(m) denotes the main board.

In the pipe type concentration sensor 8B, a polarizing plate 128 (FIG. 15) is interposed between the first surface 104*a* of the sapphire prism 140 and the diffusion plate 114. The sapphire prism 140 has a characteristic that a refractive index varies depending on a polarization direction and is not stable. The refractive index can be stably detected by adjusting the polarization direction by the polarizing plate 128. The polarizing plate 128 is arranged behind the diffusion plate 114, and selectively transmits only P-polarized light. This is to obtain a waveform having a steep inclination in a light reception waveform illustrated in FIG. 20.

When the sapphire prism and the quartz prism are compared regarding the prism 104, the sapphire prism has a characteristic that oil easily adheres to the surface thereof (a contact angle in water is about 10°). On the other hand, the quartz prism has a characteristic that oil hardly adheres to the surface thereof (a contact angle in water is about 90°). In the probe type concentration sensor 8A (FIG. 14) adopting the quartz prism 130 as the prism 104, preferably, the second surface 104*b* in contact with the measurement target liquid S is polished and coated with a hydrophilic coating. The polishing and hydrophilic coating makes oil hardly adhere to the second surface 104*b* (the contact angle in water becomes 135°). This makes it possible to provide the quartz prism 130 with resistance to adhesion of dirt in relation to the second surface 104*b* even when the quartz prism 130 is adopted and used in a severe contaminated environment.

In addition, as can be clearly seen from FIGS. 14 and 15, the detection window 86 of the probe type concentration sensor 8A and the detection window 90 of the pipe type concentration sensor 8B are flush with the second surface 104*b* of the prism 104. For example, when the second surface 104*b* of the prism 104 is located to be lower than the detection window 86 or 90, a recess is formed in the detection window 86 or 90 by the second surface 104*b*, and oil and air bubbles contained in the measurement target liquid S easily remain in the recess. On the other hand, the detection windows 86 and 90 of the probe type concentration sensor 8A (FIG. 14) and the pipe type concentration sensor 8B (FIG. 15) of the embodiment are both provided with a flush shape so as not to form a recess between the housing and the second surface 104*b*, and thus, it is possible to prevent occurrence of a phenomenon in which the recess is formed between the detection window 86 or 90 and the second surface 104*b* and oil or air bubbles easily remain in the recess. This contributes to improving the accuracy in measurement of the concentration of the measurement target liquid S. In addition, as can be seen from FIGS. 6 and 8, the detection window 86 of the probe type concentration sensor 8A is formed on a vertical surface of the detection unit 8A-1 and has a vertically long shape. As a result, it is possible to effectively prevent oil or air bubbles from adhering to the detection window 86.

In the probe type concentration sensor 8A of FIG. 14, the entire portion illustrated in FIG. 14 is placed in a fluid and permanently installed in an environment of being surrounded by the liquid. Therefore, the entire waterproof structure is maintained in the above-described portion.

In the pipe type concentration sensor 8B of FIG. 15, only the vicinity of the prism 140 is constantly in contact with the liquid S as illustrated in FIG. 13, and the other portion out of the portion illustrated in FIG. 15 is not constantly in contact with the liquid. Since it is sufficient to perform waterproofing from the surrounding liquid, waterproofing is performed around a liquid-contact surface of the prism 140.

The basic structure common to the probe type concentration sensor 8A and the pipe type concentration sensor 8B described above with reference to FIG. 16 includes the light projecting lens 112 that receives light of the LED light source 102 and converts the light to be substantially parallel light and the diffusion plate 114, and the diffusion plate 114 forms the surface light source practically. If the diffusion plate 114 is configured as a point light source, the measurement accuracy is affected by contamination of the second surface 104*b* in contact with the measurement target liquid S through the detection windows 86 and 90 and oil film unevenness. On the other hand, in the probe type concentration sensor 8A and the pipe type concentration sensor 8B of the embodiment, the surface light source with the light having the plurality of angular components converted at the respective points of the diffusion plate 114 is formed by the combination of the light projecting lens 112 that generates the substantially parallel light and the diffusion plate 114 that diffuses the substantially parallel light of the light projecting lens 112. This surface light source can level the influence of the oil film unevenness on the second surface 104*b* in contact with the measurement target liquid S. In addition, the stable concentration measurement can be performed even if air bubbles locally adhere to the second surface 104*b*.

In a case where an absolute value of the amount of light reception in the imaging element 106 decreases, it is also possible to display a warning to the user by the display 64 or the display lamps 8A-2 and 8B-2 on the assumption that there is an abnormality in the target liquid or the detection windows 86 and 90. This is because there is a high possibility of occurrence of an abnormality in the refractive index measurement, that is, the concentration measurement due to the presence of dirt in the target liquid itself or the adhesion of dirt to the detection windows 86 and 90. In response to this, the user can remove the dirt adhering to the detection windows 86 and 90 and confirm the dirt of the target liquid itself. Since it is not possible to sense dirt in a conventional concentration sensor, it is difficult for the user to understand whether there is a change in concentration (there is a change in a fluid) or maintenance is required for measurement due to adhesion of dirt to the concentration sensor although there is no change in the fluid. On the other hand, dirt can be sensed in the embodiment, and thus, the user can grasp whether the fluid has changed or it is time for periodic maintenance, and time is not wasted to investigate a cause.

Figure 19:
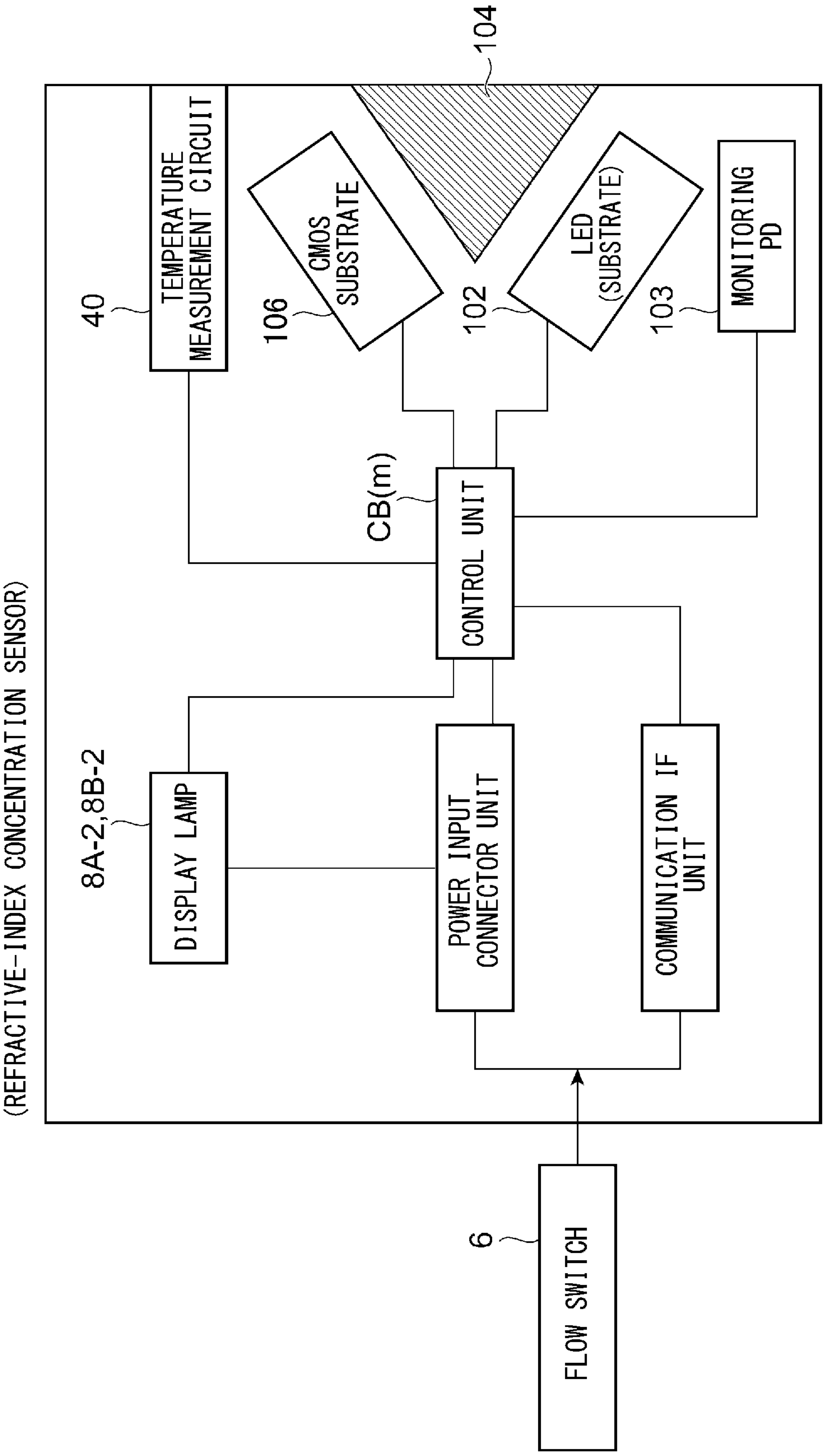
FIG. 19 is a block diagram of the pipe type concentration sensor and the probe type concentration sensor.

FIG. 19 is a block diagram of the refractive-index concentration sensor 8 of the probe type 8A and the pipe type 8B according to the embodiment. The refractive-index concentration sensor 8 has one signal cable for the outside in both the probe type 8A and the pipe type 8B. As illustrated in FIG. 1, the clamp-on ultrasonic flow switch 6 is connected to the refractive-index concentration sensor 8 via a branch connector. The ultrasonic flow switch 6 is connected by one of the cables 107 including a power line and a communication line. The signal line is divided into the power line and a communication IF unit inside the refractive-index concentration sensor, and the power line supplies power to each circuit element in the refractive-index concentration sensor. The communication IF is configured to perform bidirectional communication from the flow switch 6 to the concentration sensor 8 and from the concentration sensor 8 to the flow switch 6. The control unit CB (m) controls an LED substrate (the LED light source 102) to irradiate the prisms 130 and 140 with light, and the CMOS substrate 106 receives the light reflected by the liquid is received and converts the light into a refractive index according to a light receiving position. The monitoring PD 103 is provided in the vicinity of the LED light source 102 of the LED substrate, and monitors the amount of light emission of the LED. The current to be supplied to the LED light source 102 is adjusted according to the amount of light emission of the LED light source 102, and the amount of light emission is controlled to be constant. The display lamps 8A-2 and 8B-2 change a lighting state according to the light receiving state and the refractive index in the CMOS substrate 106. The temperature measurement circuit 40 including a thermometer is provided on the liquid level side of the refractive-index concentration sensor 8. A temperature of the fluid may be displayed depending on the temperature obtained by the thermometer of the temperature measurement circuit 40. In addition, since the refractive index of the liquid changes depending on the temperature, the obtained concentration may be corrected using the liquid temperature in order to correct such temperature dependence.

Here, the refractive-index concentration sensors 8A and 8B can detect "dirt sensing" of the detection windows 86 and 90, and can also detect that the fluid is in a dry state ("dryness sensing").

In the "dirt sensing", it is determined that dirt adheres to the detection windows 86 and 90 based on the light reception waveform obtained by the imaging element 106. When the fluid S is present and the detection windows 86 and 90 are not dirty, there are a site where the amount of light reception is large and a site where the amount of light reception is small. Whether the detection windows 86 and 90 are dirty can be determined by performing a predetermined calculation on a waveform signal obtained by differentiating the light reception waveform. When it is determined that the detection windows 86 and 90 are dirty, the display lamps 8A-2 and 8B-2 are used to notify the user of the presence of dirt. Here, the light reception waveform changes gently when there is dirt, and thus, an intensity, a peak width, and the like of the waveform signal obtained by the differentiation are different from those in a state in which there is no dirt.

Figure 20:
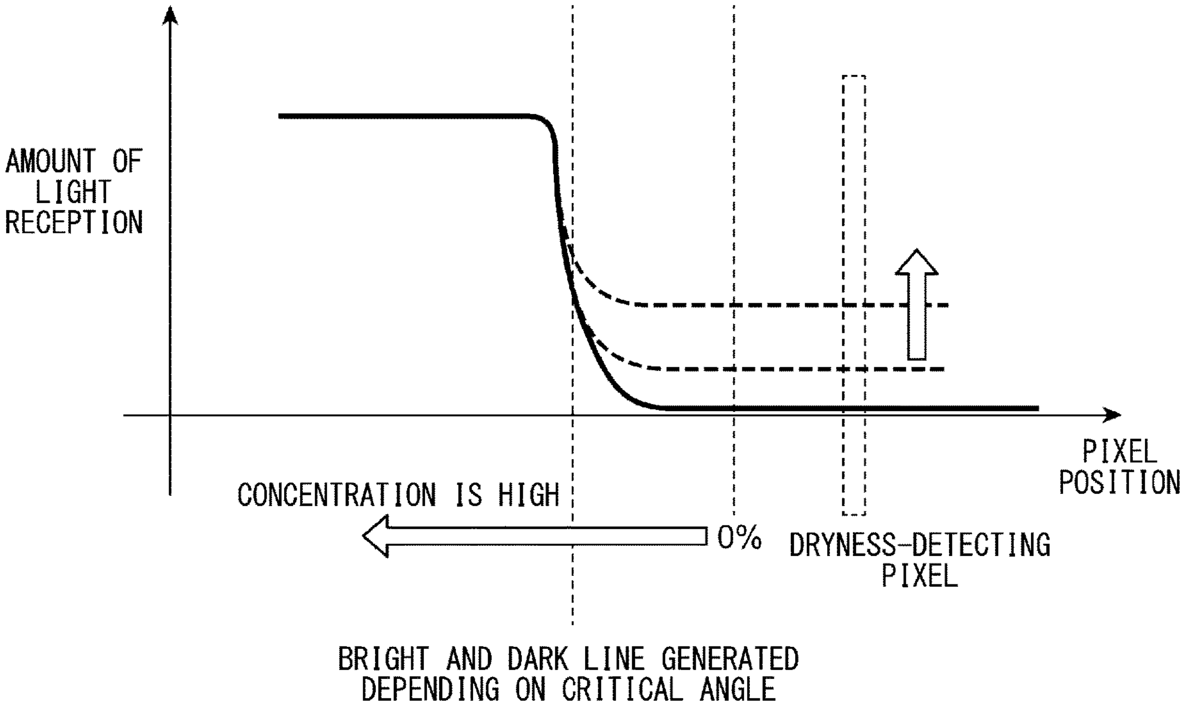
FIG. 20 is a view for describing dryness sensing using the refractive-index concentration sensor.

Referring to FIG. 20, in the "dryness sensing", a pixel in a region not used for the refractive index measurement in a light receiving region of the imaging element 106 is used for the dryness sensing. That is, in the CMOS imaging element 106, there is a pixel position that does not receive a light reception signal even when the liquid concentration is 0%. The pixel is used as a dryness-detecting pixel.

When a liquid is present in a fluid, the light from the LED light source 102 does not enter a pixel corresponding to an angle smaller than a critical angle according to a refractive index of the liquid. Therefore, the amount of light reception in the dryness-detecting pixel is zero or close to zero. On the other hand, when no liquid is present in a fluid, air is present at an interface between the detection windows 86 and 90, and the amount of light reception in the dryness-detecting pixel increases. When the amount of light reception in the dryness-detecting pixel exceeds a certain threshold, it is determined that dryness has occurred, and the display lamp 8A-2 or 8B-2 or the display 64 displays the occurrence of dryness.

Both a level of the dryness sensing and a level of the dirt sensing can be set by the user, and can be selected from "low", "medium", and "high", or from Levels 1 to 4. This selection can be made by the user's input to the display 64, and the level of the dryness sensing or the dirt sensing can be changed. The ease of occurrence of dryness or dirt varies depending on a fluid to be used and a surrounding environment. Considering such a fact, uniform dryness or dirt sensing is not appropriate. Therefore, the level of the dryness sensing or the dirt sensing can be set by the user as described above.

Figure 21:
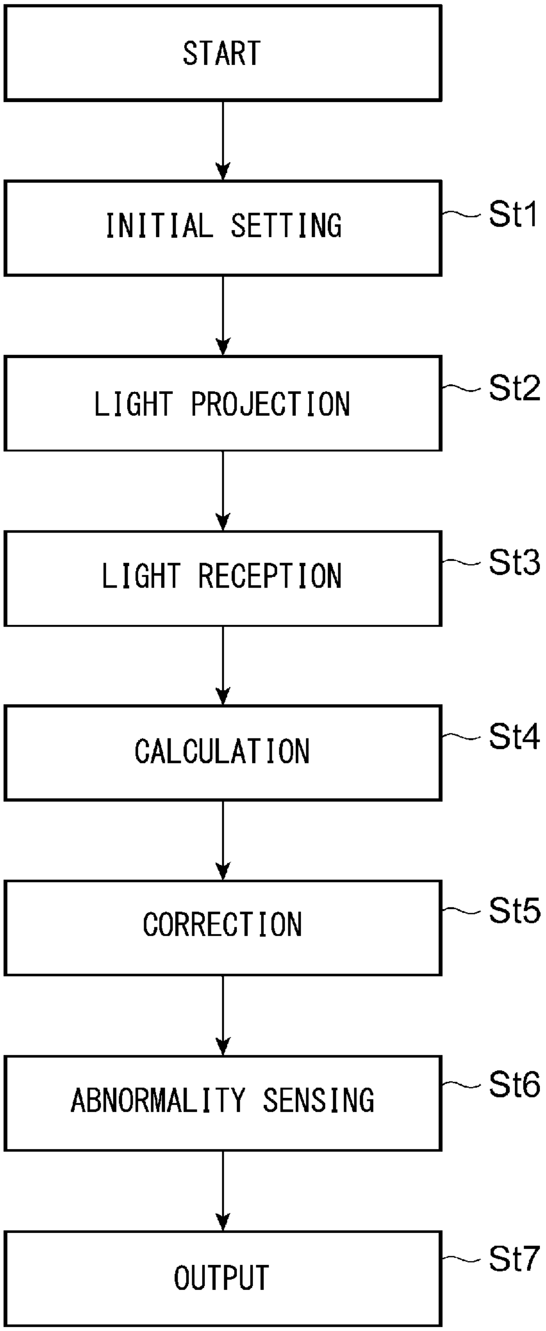
FIG. 21 is a flowchart of a concentration calculation by the refractive-index concentration sensor.
Figure 22:
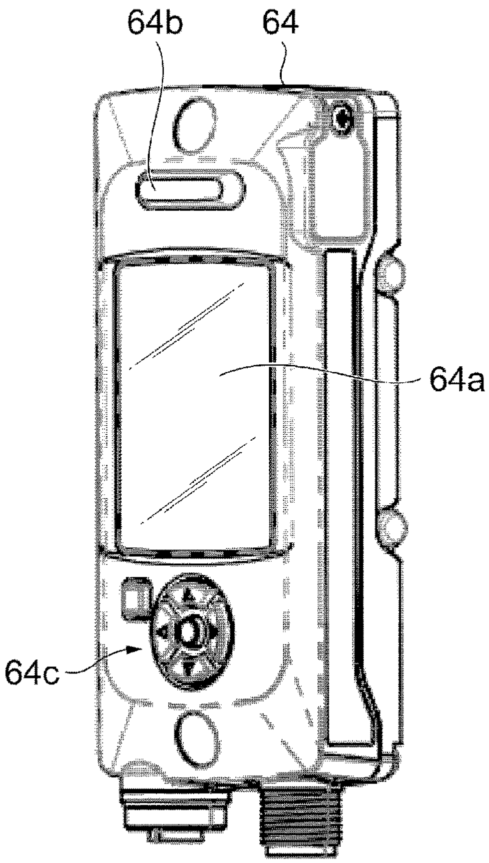
FIG. 22 is a perspective view of the clamp-on ultrasonic flow switch.
Figure 23:
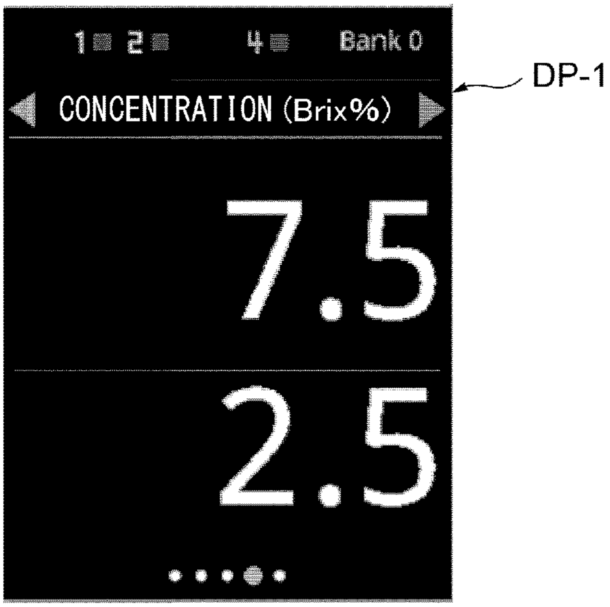
FIG. 23 illustrates a display example when a current value (concentration) is selected on a menu display screen displayable on a display in the ultrasonic flow detection device.

A method of calculating the concentration by the refractive-index concentration sensor according to the embodiment will be described with reference to FIG. 21. This is common to the pipe type and the probe type. First, as St1, in the display 64 attached to a flow sensor of FIG. 22 for initial settings, the display lamp 64*b* that is large is provided above the display unit 64*a*, and the operation unit 64*c* is provided below the display (FIG. 22). With the operation unit 64*c*, it is possible to input settings according to a screen appearing on the display unit 64*a*. A unit and a threshold of the concentration to be displayed on the display unit 64*a* are set by an input to the operation unit 64*c*.

Next, as St2, light projection from the LED light source 102 is controlled. Timing control is performed to perform pulsed light emission. This is to increase resistance against noise caused by disturbance light. The noise of the disturbance light can be removed by canceling a light reception signal at the time of non-light emission during the pulsed light emission.

In addition, the LED light source 102 controls the amount of light emission. The monitoring PD 103 monitors the amount of light emission of the LED light source 102, and controls the LED light source 102 such that the amount of light emission becomes constant. This is because signal processing of the light reception waveform becomes easy when the amount of light emission in the imaging element is constant by controlling the amount of light emission of the LED light source 102 after the next timing by the light reception signal in the monitoring PD 103 to make the amount of light reception from the light projection side constant. This leads to the improvement in accuracy.

Next, as St3, light is received by the imaging element (CMOS substrate) 106. Regarding the imaging element 106, the imaging element 106 is arranged in the housing such that pixels are arrayed at positions corresponding to reflection angles in the detection window 86. The imaging element 106 acquires the light reception distribution. At this time, exposure is controlled in synchronization with a lighting timing at which the pulsed light emission is performed on a light emitting element side. It is possible to take a countermeasure against the disturbance light by excluding the amount of light reception at the time of non-light emission from a light reception waveform signal as the disturbance light.

Next, as St4, a pixel position of a bright and dark line is determined based on the light reception distribution as illustrated in FIG. 20 obtained by the imaging element 106. Since the reflection angle changes depending on the concentration of the liquid, a position where brightness and darkness occur changes depending on the concentration. In this manner, the refractive index is converted to the concentration by utilizing the change in the refractive index depending on the concentration and a correspondence relationship between the refractive index and the concentration.

Here, as indicated by St5, the concentration is corrected based on a temperature. This is because the correspondence relationship between the refractive index and the concentration changes depending on the temperature of the liquid, and thus, the correction is performed based on the temperature at the time of conversion from the refractive index to the concentration by using the temperature acquired by the temperature measurement circuit 40.

As indicated by St6, abnormality sensing is performed based on the light reception waveform and the light reception signal in the imaging element 106. In the dryness sensing, the dryness-detecting pixel in imaging element 106 is used. The dirt sensing is determined based on the steepness of a change in brightness and darkness in the light reception waveform. In addition, if there is a large amount of disturbance light and the light reception signal is high in a concentration detection range, it is also possible to determine that there is disturbance light. Note that the abnormality sensing may be performed in parallel with the concentration calculation and correction, or may be performed before the concentration calculation and correction.

To sum up St3 to St6, the bright and dark line of the light reception waveform changing depending on the critical angle is acquired to acquire the refractive index correlated with the concentration in order to measure the concentration. Although the refractive index is correlated with the concentration, there is a difference depending on the temperature. Thus, a conversion table from the refractive index to the concentration is corrected based on the temperature, and the concentration is measured.

As St7, the obtained concentration is displayed on the display unit 64*a* of the display 64. A threshold is compared with a current location, and the result thereof is displayed on the display lamp 64*b* of the display 64. In addition, a content of the abnormality sensing may be displayed on the display unit 64*a* of the display 64, and the display lamp 64*b* may be used to indicate a lighting state or a blinking state corresponding to the content of abnormality.

Figure 24:
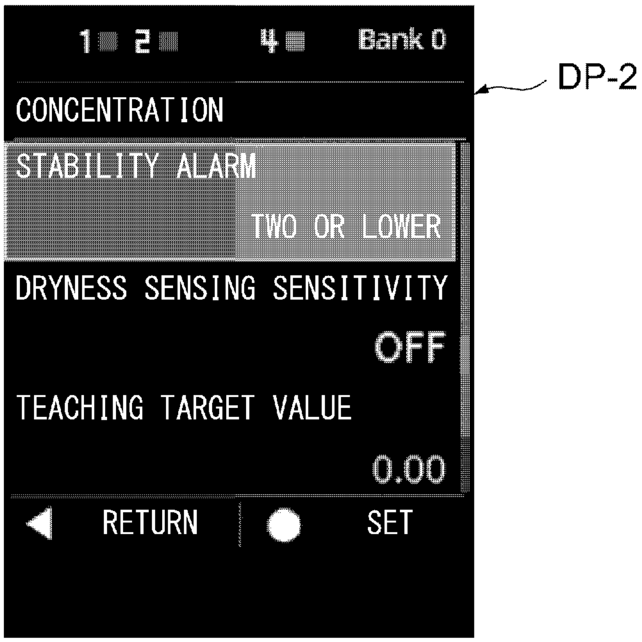
FIG. 24 illustrates a screen on which settings related to the concentration sensor can be made using a display screen of the display in the ultrasonic flow detection device of the embodiment.

As illustrated in FIG. 24, it is possible to set a threshold of an alarm for dirt of the detection window 86 as a stability alarm. If the threshold is set to be low, an alarm indicating that the detection window is dirty and prompting maintenance of the detection window is output to the display lamp 64*b* of the display 64 and the display lamps 8A-2 and 8B-2 even with little dirt. If the threshold is set to be high, no alarm is output unless dirt increases relatively. The user can change the alarm threshold according to a property of the liquid S and a property of a solute in the liquid S.

A threshold for dryness sensing sensitivity can be also changed by an input to the operation unit, the dryness sensing can be turned off, and sensitivity settings can be changed. When the sensitivity is set to be high, a warning can be displayed when there is even a little dryness in the detection window, or when the liquid level of the tank decreases and a part of the window becomes the liquid level, and a portion above the liquid level is dried in the case of the probe type.

A teaching target value is so-called zero point adjustment, and the target value is set for a certain liquid to serve as a reference of the concentration to adjust the reference of the concentration. This setting can be made through the operation unit 64*c* and the display 64*a*.

Although the embodiment of the invention has been described above in relation to the ultrasonic flow detection device, it is a matter of course that the invention can be widely and generally applied to refractive-index concentration sensors regardless of the ultrasonic flow detection device.

What is claimed is:

1. A refractive-index concentration sensor that measures a concentration of a coolant including a water-soluble cutting oil comprising:

a cable that includes a power line to supply power to the refractive-index concentration; and a housing that has a cable connector unit connected to the cable, the housing having a detection window located on a surface other than a part on which the cable connector unit is provided, wherein the housing accommodates:

a light source;

a light projecting lens that converts light emitted from the light source into substantially parallel light;

a diffusion plate that forms a surface light source, the diffusion plate diffuses the substantially parallel light converted by the light projecting lens and converts the substantially parallel light into diffused light having a plurality of angular components at points of the diffusion plate;

a prism that has a first surface to receive the diffused light transmitted through the diffusion plate, a second surface to reflect the diffused light depending on a refractive index of the coolant including the water-soluble cutting oil in contact with the coolant as a measurement target liquid, and a third surface to extract the reflected light generated by the diffused light being reflected at the second surface;

a light receiving lens that receives the reflected light received by the third surface of the prism and that collects the reflected light;

an imaging element that receives the collected light through the light receiving lens and that acquires a light amount distribution corresponding to the collected light;

a main board that is supplied with power via the power line included in the cable; and a holder that is fixed to the housing such that the holder presses the prism from an inner side to an outer side and the second surface of the prism is exposed from the detection window of the housing, the light source, the light projecting lens, the diffusion plate, the light receiving lens, and the imaging element being fixed to the holder, wherein the refractive-index concentration sensor is configured to calculate the concentration of the coolant, based on a position of a bright and dark line generated depending on a critical angle determined by the light amount distribution of the collected light and a correspondence relationship between the refractive index and the concentration.

2. The refractive-index concentration sensor according to claim 1, wherein the prism is configured using a quartz prism, and the second surface of the quartz prism in contact with the measurement target liquid is polished and coated with a hydrophilic coating.

3. The refractive-index concentration sensor according to claim 1, wherein the housing includes a detection unit and a rod-like part extending from the detection unit, and the refractive-index concentration sensor is used in a state where the rod-like part is provided in a vertical direction with respect to the liquid with the detection unit facing down and the detection window is oriented in a substantially horizontal direction.

4. The refractive-index concentration sensor according to claim 1, wherein the refractive-index concentration sensor is operated in a state in which a detection unit of the refractive-index concentration sensor is inserted into the measurement target liquid.

5. The refractive-index concentration sensor according to claim 1, wherein the detection unit is arranged at one end and a display lamp is arranged at another end in a longitudinal direction of the refractive-index concentration sensor, and the display lamp is turned on or off when a concentration of the measurement target liquid exceeds a threshold.

6. The refractive-index concentration sensor according to claim 1, wherein the prism is configured using a sapphire prism, and a polarizing plate is interposed between the first surface of the sapphire prism and the diffusion plate, and wherein the polarizing plate is fixed to the holder.

7. The refractive-index concentration sensor according to claim 6, wherein the refractive-index concentration sensor is operated in a state of being arranged with a detection unit of the refractive-index concentration sensor facing an inside of a pipe through which the measurement target liquid flows.

8. The refractive-index concentration sensor according to claim 7, further comprising a terminal configured to connect the refractive-index concentration sensor to an outside device, wherein a display lamp is arranged on the terminal, and the display lamp is turned on or off when a concentration of the measurement target liquid exceeds a threshold.

9. The refractive-index concentration sensor according to claim 1, wherein a user is notified of information related to adhesion of dirt to the second surface.

10. The refractive-index concentration sensor according to claim 1, wherein a user is notified of information related to absence of the liquid on the second surface.

11. The refractive-index concentration sensor according to claim 1, wherein a water-blocking member is interposed between the prism and the housing, and the prism and the housing are pressed by the water-blocking member to be in close contact with and fixed to each other when the prism is pressed from the inner side to the outer side by the holder.

12. The refractive-index concentration sensor according to claim 1, further comprising a second imaging element for monitoring provided incident to the light source, and wherein the light source is controlled based on an amount of light received by the imaging element to adjust an amount of light emission.

13. The refractive-index concentration sensor according to claim 1, further comprising a temperature sensor provided in the housing, wherein a refractive index or a concentration is corrected by a temperature obtained by the temperature sensor.

14. The refractive-index concentration sensor according to claim 1, wherein the housing has a first stepped part in a portion to be engaged with the prism, and the prism has a second stepped part in a portion to be engaged with the housing, and wherein the first part and the second part engage with each other when the prism is pressed from the inner side to the outer side by the holder.

15. The refractive-index concentration sensor according to claim 1, wherein the housing is detachably attached by using a jig.

16. The refractive-index concentration sensor according to claim 1, wherein the housing is detachably attached by retrofitting.

17. The refractive-index concentration sensor according to claim 1, wherein the refractive-index concentration sensor is configured to perform dirt sensing based on the light amount distribution acquired by the imaging element.

18. The refractive-index concentration sensor according to claim 1, wherein the refractive-index concentration sensor is configured to perform dryness sensing based on the light amount distribution acquired by the imaging element.

* * * * *